United States Patent
Kikushima

(10) Patent No.: US 7,391,978 B2
(45) Date of Patent: Jun. 24, 2008

(54) OPTICAL SIGNAL TRANSMITTER AND OPTICAL SIGNAL TRANSMISSION SYSTEM

(75) Inventor: Koji Kikushima, Ichikawa (JP)

(73) Assignee: Nippon Telegraph and Telephone Corporation (JP)

( * ) Notice: Subject to any disclaimer, the term of this patent is extended or adjusted under 35 U.S.C. 154(b) by 545 days.

(21) Appl. No.: 10/525,615

(22) PCT Filed: Jul. 9, 2004

(86) PCT No.: PCT/JP2004/009837

§ 371 (c)(1),
(2), (4) Date: Feb. 25, 2005

(87) PCT Pub. No.: WO2005/006600

PCT Pub. Date: Jan. 20, 2005

(65) Prior Publication Data

US 2005/0244155 A1    Nov. 3, 2005

(30) Foreign Application Priority Data

Jul. 11, 2003    (JP)    ............................. 2003-273173

(51) Int. Cl.
*H04B 10/04* (2006.01)
(52) U.S. Cl. .................. 398/187; 398/182; 398/183; 398/184; 359/278
(58) Field of Classification Search ................. 398/163, 398/187, 204, 182–184; 359/278
See application file for complete search history.

(56) References Cited

U.S. PATENT DOCUMENTS

| | | | | |
|---|---|---|---|---|
| 4,889,134 A | * | 12/1989 | Greenwold et al. | ......... 600/509 |
| 5,896,211 A | * | 4/1999 | Watanabe | ..................... 398/76 |
| 5,896,216 A | * | 4/1999 | Kikushima et al. | ........... 398/176 |
| 6,014,243 A | * | 1/2000 | Saeki | ......................... 359/278 |
| 6,233,254 B1 | * | 5/2001 | Myers | ........................ 370/480 |

(Continued)

FOREIGN PATENT DOCUMENTS

JP    10-013353    *    1/1998

(Continued)

OTHER PUBLICATIONS

Etsugo Yoneda et al. "Fully Engineered Multi-Channel FM-SCM Video Distribution Systems" by Jounarl of Lightwave Technology, vol. 12, No. 2, Feb. 1994.*

(Continued)

*Primary Examiner*—Kenneth Vanderpuye
*Assistant Examiner*—Phyowai Lin
(74) *Attorney, Agent, or Firm*—Fitch, Even, Tabin & Flannery

(57) ABSTRACT

The invention provides an optical signal transmitter low in noise and in distortion and provides an optical signal transmission system using this optical signal transmitter.

The optical signal transmitter includes a plurality of frequency modulation means for distributing an electric signal into a plurality of electric signals and applying frequency modulation to the distributed electric signals to output and a multiplexing mean for multiplexing a plurality of signals output from the plurality of frequency modulation means and outputting a multiplexed signal. The plurality of frequency modulation means are set to be substantially equal to each other in frequency deviation and in intermediate frequency and to be substantially identical to each other in the phase of each output.

5 Claims, 15 Drawing Sheets

U.S. PATENT DOCUMENTS

| | | | |
|---|---|---|---|
| 6,504,636 B1 * | 1/2003 | Seto et al. | 398/91 |
| 6,658,216 B1 * | 12/2003 | Iida et al. | 398/187 |
| 2001/0050768 A1 * | 12/2001 | Uchiyama et al. | 356/73.1 |

FOREIGN PATENT DOCUMENTS

| | | |
|---|---|---|
| JP | 2700622 | 1/1998 |
| JP | 2001-119097 | 4/2001 |

OTHER PUBLICATIONS

Koji Kikushima et al. "Super-Wide-Band Optical FM Modulation Scheme and its Application to Multichannel AM Video Transmission Systems" by IEEE Photonics Technology Letter, vol. 8, No. 6, Jun. 1996.*

Transmission equipment for transferring multi-channel television signals over optical access networks by FM conversion, International Standard, ITU-T J. 185.

Shibata et al., Optical image distribution system using an FM batch conversion method, Institute of Electronics, Information and Communication Engineers, Technical Journal B, vol. J83-B, Nos. 7, Jul. 2000, pp. 948-959 (only pertinent part is translated).

Suzuki et al., Pulsed FM batch conversion modulation analog optical CATV distribution method, Institute of Electronics, Information and Communication Engineers, Autumn Conference, B-603, 1991 (All the document is translated).

Kobayashi, Masahiko, et al., Push-Pull FM Optical Modulator/Transmitter for Optical Video Transmission System Employing Super Wide-Band FM Scheme, The Institute of Electronics, Information and Communication Engineers, vol. 1998, Society B2, Sep. 29, 1998, p. 448 (All the document is translated).

Transmission equipment for transferring multi-channel television signals over optical access networks by FM conversion, International Standard, ITU-T J. 185, Feb. 2002.

* cited by examiner

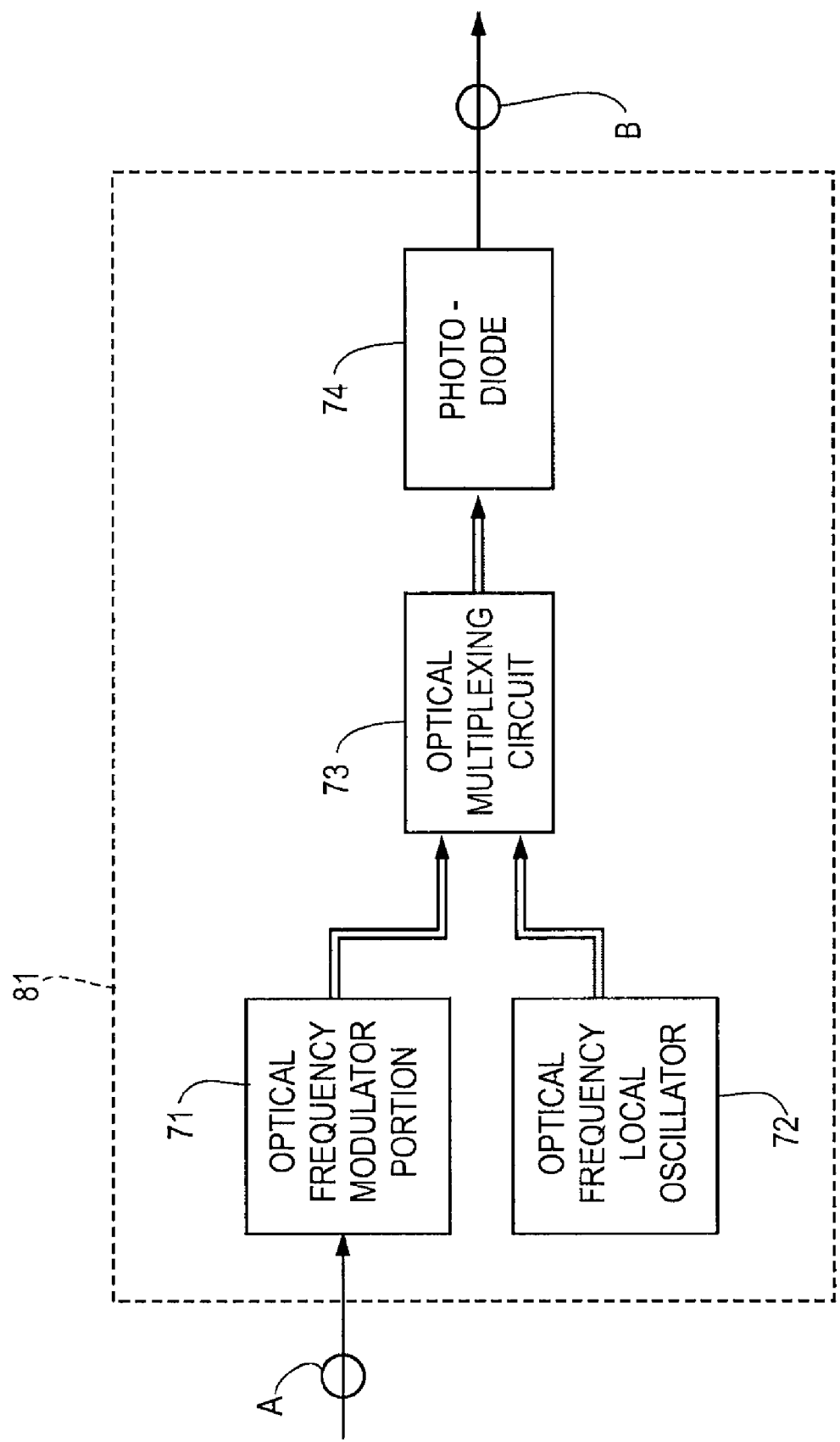

OPTICAL SIGNAL TRANSMITTER AND OPTICAL SIGNAL TRANSMISSION SYSTEM

TECHNICAL FIELD

The present invention relates to an optical signal transmitter used for optical transmission of wideband signals, and relates to an optical signal transmission system using this optical signal transmitter. More particularly, the present invention relates to an optical signal transmitter used for optical transmission of multichannel video signals that have undergone frequency-division multiplexing and that have undergone amplitude modulation (abbreviated as "AM") or quadrature amplitude modulation (abbreviated as "QAM"), and relates to an optical signal transmission system using this optical signal transmitter.

BACKGROUND ART

Conventionally, an optical signal transmitter and an optical signal transmission system employing a method for subjecting video signals, which have undergone frequency-division multiplexing, to frequency modulation as a single unit (this method will be hereinafter referred to as an "FM batch conversion method") are known as an optical signal transmitter and an optical signal transmission system used for optical transmission of multichannel video signals that have undergone frequency-division multiplexing and that have undergone amplitude modulation or quadrature amplitude modulation.

An optical signal transmitter and an optical signal transmission system that employ this FM batch conversion method are disclosed in Non-patent Document 1.

FIG. 1 shows a structure of a conventional optical signal transmitter and a conventional optical signal transmission system that employ the FM batch conversion method. FIGS. 2A, 2B, and 2C show signal forms at point "A," point "B," and point "C" of FIG. 1, respectively. The optical signal transmission system of FIG. 1 is comprises an optical signal transmitter 80 including an FM batch conversion circuit 81, a light source 82, and an optical amplification circuit 83, an optical transmission path 85, an optical signal receiver 90 including a photoelectric conversion circuit 91 and an FM demodulation circuit 92, a set-top box 93, and a television receiver 94. Signal spectra at point "A," point "B," and point "C" of FIG. 1 are shown in FIGS. 2A, 2B, and 2C, respectively. The same applies to point "A," point "B," and point "C" of each figure shown below.

In the optical signal transmitter 80 of FIG. 1, frequency-multiplexed video signals shown in FIG. 2A are converted into one wideband frequency-modulated signal shown in FIG. 2B by the FM batch conversion circuit 81. The frequency-modulated signal is subjected to intensity modulation by the light source 82, and is further subjected to optical amplification by the optical amplification circuit 83, and is transmitted to the optical transmission path 85. In the optical signal receiver 90, the frequency-modulated signal that has undergone intensity modulation is photoelectrically converted by the photoelectric conversion circuit 91, and is returned to an electric signal. This electric signal, which is a wideband frequency-modulated signal, is subjected to frequency demodulation by the FM demodulation circuit 92, and the frequency-multiplexed video signals are demodulated as shown in FIG. 2C. The demodulated video signals pass through the set-top box 93, and reach the television receiver 94, whereby a desired video channel is selected.

FIG. 3 shows the structure of an FM batch conversion circuit that is applicable to the FM batch conversion method (see Patent Document 1, Non-patent Document 2, Non-patent Document 3, for example). The FM batch conversion circuit shown in FIG. 3 uses an optical frequency modulation portion and an optical frequency local oscillation portion. The FM batch conversion circuit 81 comprises the optical frequency modulation portion 71, the optical frequency local oscillation portion 72, an optical multiplexer 73, and a photodiode 74.

When frequency modulation is performed with a frequency fs by use of a carrier light source having an optical frequency fo in the optical frequency modulation portion 71 of the FM batch conversion circuit 81, an optical frequency Ffmld of an optical signal in the output of the optical frequency modulation portion 71 is expressed as in the following equation:

$$Ffmld = fo + \delta f \cdot \sin(2\pi \cdot fs \cdot t) \qquad (1)$$

where $\delta f$ is a frequency deviation. A DFB-LD (Distributed Feed-Back Laser Diode) is used as the carrier light source of the optical frequency modulation portion 71.

In the optical frequency local oscillation portion 72, oscillation is performed by use of an oscillation light source having an optical frequency f1. An optical signal transmitted from the local oscillation portion 72 and an optical signal transmitted from the optical frequency modulation portion 71 are multiplexed by the optical multiplexer 73. The DFB-LD is used as the oscillation light source of the optical frequency local oscillation portion 72. The two optical signals multiplexed by the optical multiplexer 73 are detected by the photodiode 74 that is an optical heterodyne detector. The frequency f of the electric signal detected thereby is expressed as follows:

$$f = fo - f1 + \delta f \cdot \sin(2\pi \cdot fs \cdot t) \qquad (2)$$

Herein, if the optical frequency of the carrier light source of the optical frequency modulation portion 71 and the optical frequency of the oscillation light source of the optical frequency local oscillation portion 72 are caused to come close to each other, it is possible to obtain an electric signal whose frequency is modulated to have an intermediate frequency fi=fo−f1 of several GHz and have a frequency deviation $\delta f$ as shown in FIG. 2B.

Generally, the modulation by an input electric current allows the DFB-LD to have an optical frequency varied in the range of several GHz in accordance with the input electric current, and hence a value of several GHz can be obtained as the frequency deviation $\delta f$. For example, a multichannel AM video signal or QAM video signal that have undergone frequency multiplication so as to have a frequency range of about 90 MHz to about 750 MHz can be converted by the FM batch conversion circuit into a frequency-modulated signal having a frequency band of about 6 GHz in which the intermediate frequency fi=fo−f1 becomes equal to about 3 GHz as shown in FIG. 2B.

FIG. 4 shows the structure of an FM demodulation circuit applicable to the optical signal receiver 90. The FM demodulation circuit 92 shown in FIG. 4 is an FM demodulation circuit by delay-line detection, and comprises a limiter amplifier 76, a delay line 77, an AND gate 78, and a low-pass filter 79.

In the FM demodulation circuit 92, a frequency-modulated optical signal that has been input is shaped into a square wave by the limiter amplifier 76. The output of the limiter amplifier 76 is branched into two output parts, one of which is input to an input terminal of the AND gate 78 and the other of which undergoes a polarity reversal, is then delayed by time t by means of the delay line 77, and is input to an input terminal of the AND gate 78. The output of the AND gate 78 is smoothed by the low-pass filter 79, and is turned into frequency-demodulated output (see Non-patent Document 1, for example).

A double-tuned frequency discriminator having a resonance circuit, a Foster-Seeley frequency discriminator, and a ratio detection type FM demodulator can be mentioned as a circuit form of the FM demodulation circuit, in addition to the FM demodulation circuit by delay-line detection described here.

Patent Document 1: Japanese Patent No. 2700622;
Non-patent Document 1: international standard, ITU-T J. 185, "Transmission equipment for transferring multi-channel television signals over optical access networks by FM conversion;"
Non-patent Document 2: Shibata et al. "Optical image distribution system using an FM batch conversion method," Institute of Electronics, Information and Communication Engineers, Technical Journal B, Vol. J83-B, No. 7, July, 2000, pp. 948-959;
Non-patent Document 3: Suzuki et al. "Pulsed FM batch conversion modulation analog optical CATV distribution method" Institute of Electronics, Information and Communication Engineers, Autumn Conference, B-603, 1991.

DISCLOSURE OF THE INVENTION

A low noise and a low distortion are required in transmission of the multichannel video signals described above. According to "Optical image distribution system using an FM batch conversion method" by Shibata et al., a CNR (Carrier-to-Noise Ratio) is set to be 42 dB or more, and a CSO (Composite Second-Order Distortion) and a CTB (Composite Triple Beat) are set to be −54 dB or less in an optical signal transmitter and an optical signal transmission system using an FM batch conversion method.

However, in the optical signal transmitter using the conventional FM batch conversion method, the CNR value is in a saturated state between 43 dB to 47 dB. Likewise, the CSO value and the CTB value are in a saturated state having a value slightly below −54 dB. If the optical signal transmitter can be constructed to have an even lower noise, the CNR can be enlarged, and, as a result, the minimum electric power of the optical signal receiver whose CNR is 42 dB or more can be reduced. If the minimum light-receiving power of the optical signal receiver can be reduced, the transmission distance can be lengthened, and the optical branching ratio can be enlarged.

The DFB-LD of the optical frequency modulation portion used in the conventional FM batch conversion circuit proves difficult in modification of its design when returning to its structure, and it was difficult to realize low-noise characteristics and low-distortion characteristics. It is therefore an object of the present invention to provide an optical signal transmitter low in noise and in distortion and provide an optical signal transmission system using this optical signal transmitter.

In order to achieve this object, according to a first aspect of the present invention, the present invention is characterized in that an optical signal transmitter for applying frequency modulation to amplitude-modulated electric signals that have undergone frequency division multiplexing to optically transmit the electric signals, the optical signal transmitter comprising: a distribution circuit for distributing the electric signals into a plurality of signal parts and outputting the signal parts; a plurality of frequency modulation means for applying frequency modulation to each output of the distribution circuit and emitting each output, the plurality of frequency modulation means being substantially equal to each other in frequency deviation and in intermediate frequency and being substantially identical in the phase of each output; a multiplexing means for multiplexing outputs of the plurality of frequency modulation means and outputting multiplexed outputs; and a transmitting circuit for outputting optical signals subjected to intensity modulation by the output of the multiplexing means to an optical transmission path. Herein, the electric signals that have undergone frequency-division multiplexing and amplitude modulation include electric signals that have undergone frequency-division multiplexing and quadrature amplitude modulation.

According to a second aspect of the present invention, the present invention is characterized in that an optical signal transmission system comprises the optical signal transmitter according to the first aspect of the present invention, a photoelectric conversion means connected to the optical signal transmitter through an optical transmission path, and an optical signal receiver having a frequency demodulation means for applying frequency demodulation to an output of the photoelectric conversion means.

The optical signal transmitter and the optical signal transmission system according to the present invention can obtain lower noise characteristics and lower distortion characteristics than a conventional optical signal transmitter while using conventional electric circuits and conventional optical circuit components without changing circuit constants returning to the circuit design of such electric circuits and optical circuit components.

The low noise characteristics of the optical signal transmitter make it possible to reduce the minimum light-receiving electric power of the optical signal receiver, thus making it possible to lengthen the transmission distance and to enlarge the optical branching ratio between the optical signal transmitter and the optical signal receiver.

Additionally, the low distortion characteristics thereof make it possible to improve a video-signal receiving quality.

BRIEF DESCRIPTION OF THE DRAWINGS

FIG. 3 is a block diagram showing a structure of a conventional FM batch conversion circuit applicable to the FM batch conversion method;

BEST MODE FOR CARRYING OUT THE INVENTION

Embodiments of the present invention will be hereinafter described with reference to the accompanying drawings.

Figure 5:
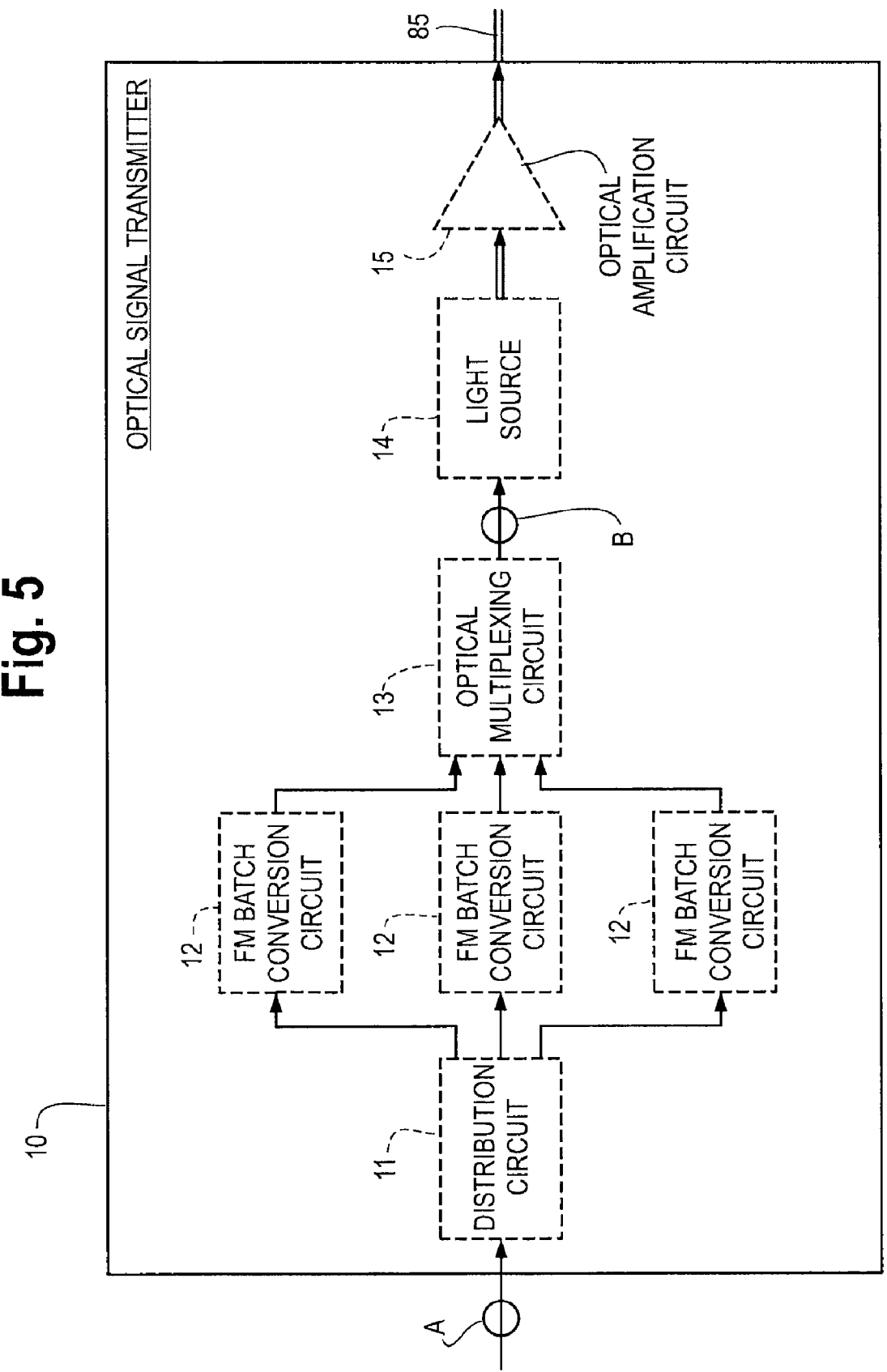
FIG. 5 is a block diagram showing a structure of an optical signal transmitter in which N FM batch conversion circuits, to which electric signals distributed by a distribution circuit are input while being modulated, are used.

A first embodiment of the present invention is an optical signal transmitter in which N FM batch conversion circuits, to which electric signals distributed by a distribution circuit are input while being modulated, are used, and is an optical signal transmission system using this optical signal transmitter. This embodiment of the present invention is shown in FIG. 5. FIG. 5 shows a case in which N=3. In FIG. 5, the optical signal transmitter 10 includes a distribution circuit 11, FM batch conversion circuits 12, an optical multiplexing circuit 13, a light source 14 serving as a transmitting circuit, an optical amplification circuit 15, and an optical transmission path 85. The light source 14 may include a semiconductor laser and a drive circuit that drives this semiconductor laser as a transmitting circuit, and the transmitting circuit may include the optical amplification circuit 15.

Figure 2A:
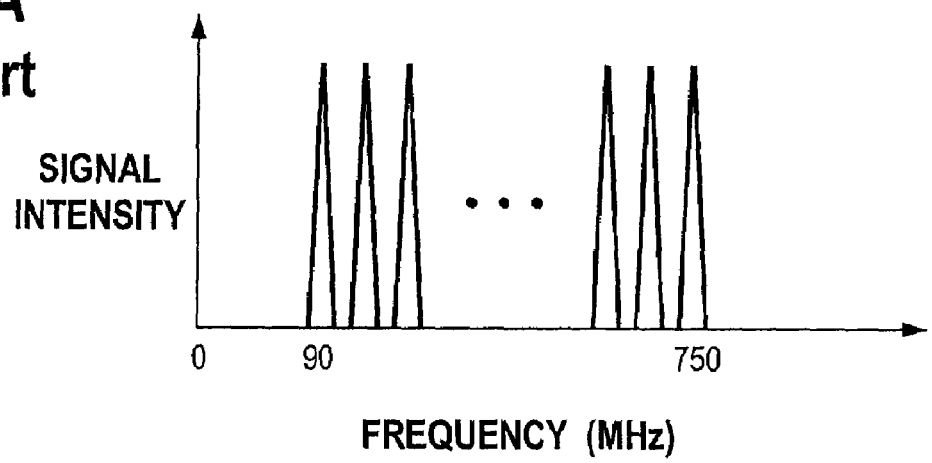
FIG. 2A is a view showing signal forms in the optical signal transmitter and the optical signal transmission system.
Figure 2B:
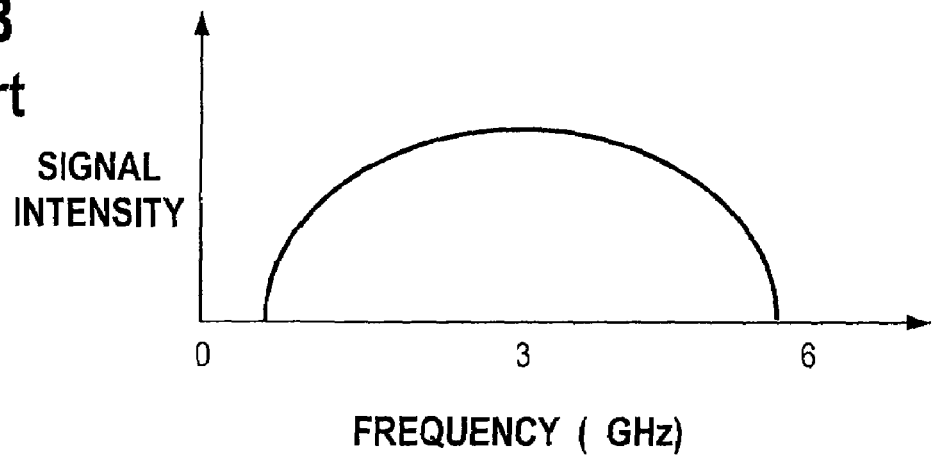
FIG. 2B is a view showing a signal form in the optical signal transmitter and the optical signal transmission system.
Figure 2C:
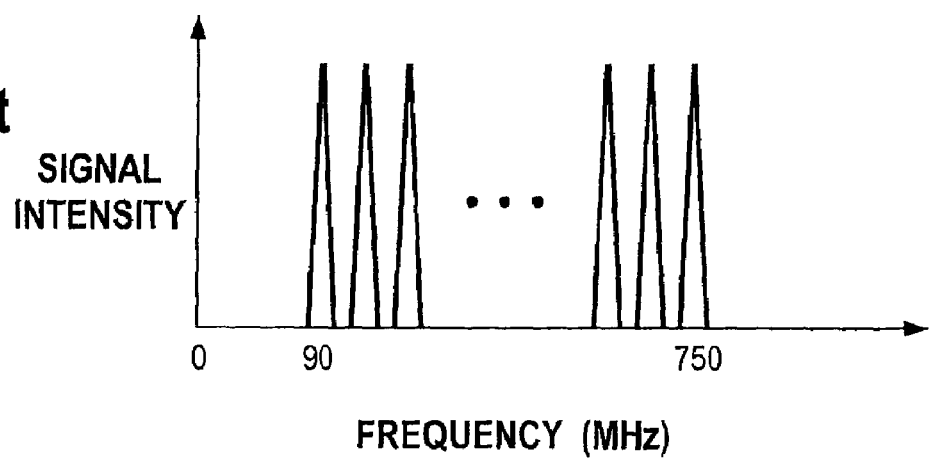
FIG. 2C is a view showing signal forms in the optical signal transmitter and the optical signal transmission system.
Figure 4:
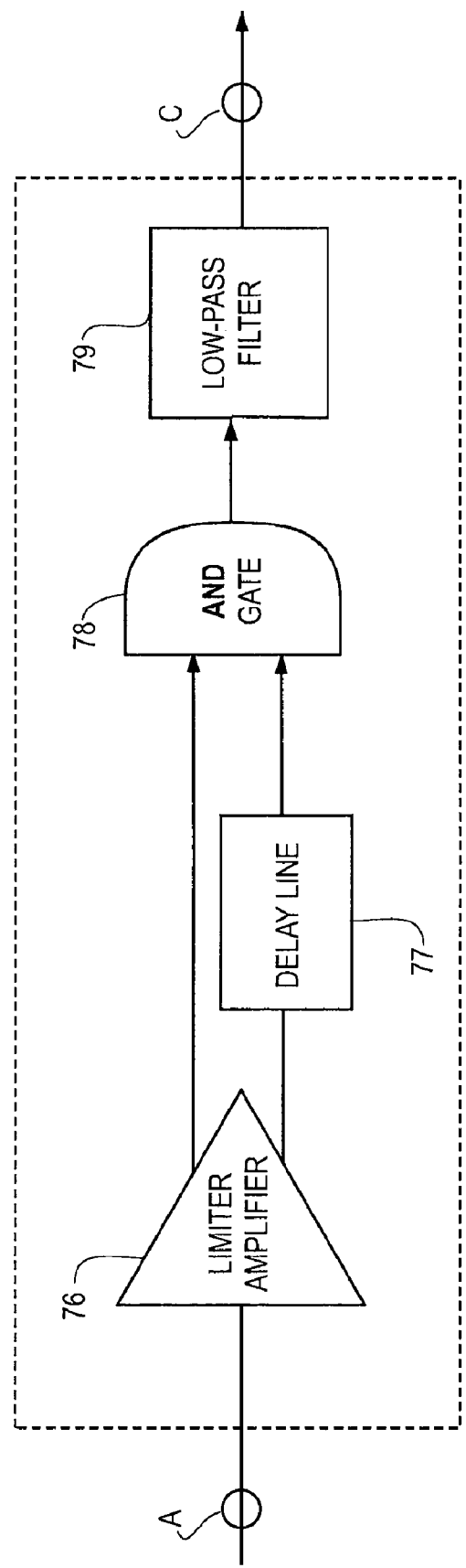
FIG. 4 is a block diagram showing a structure of an FM demodulation circuit applicable to an optical signal receiver.

In FIG. 5, when multichannel AM video signals or QAM video signals that have undergone frequency multiplication in the frequency range of about 90 MHz to about 750 MHz as shown in FIG. 2A are input to the optical signal transmitter 10, the signals are distributed into three groups of signals by the distribution circuit 11. Each output of the distribution circuit 11 is input to the FM batch conversion circuits 12 as a modulated input, and is subjected to frequency modulation by the FM batch conversion circuits 12. Outputs of the three FM batch conversion circuits 12 are multiplexed by the optical multiplexing circuit 13. The output of the optical multiplexing circuit 13 is a wideband frequency-modulated electric signal as shown in FIG. 2B. This frequency-modulated electric signal is converted into an optical signal subjected to intensity modulation by the light source 14. The optical signal is amplified to a predetermined optical level by the optical amplification circuit 15, and is transmitted to the optical transmission path 85.

Herein, if the three FM batch conversion circuits 12 are set to be equal to each other in frequency deviation and in intermediate frequency and are set to be identical to each other in the phase of each output of FM batch conversion circuits, the electric signals multiplexed by the optical multiplexing circuit 13 have their noise quantities expressed as the sum total of electric powers of the three FM batch conversion circuits 12, i.e., as an electric-power addition, and have their signal components expressed as the sum total of voltages thereof, i.e., as a voltage addition. Since the three FM batch conversion circuits 12 are set to be identical to each other in the phase of each output, it is possible to, for example, adjust the length of a transmission path, such as an optical fiber, or use a phase adjuster.

Let the voltages of signal components output from the three FM batch conversion circuits 12 be designated as Vs1, Vs2, and Vs3, respectively, and let Vs1=Vs2=Vs3=Vs. In this case, the sum total Vst of the voltages of signal components output from the optical multiplexing circuit 13 are expressed as follows:

$$Vst = Vs1 + Vs2 + Vs3 = 3Vs \quad (3)$$

Under the condition that the output of only one of the three FM batch conversion circuits 12 is input to the optical multiplexing circuit 13, the signal power Ps1 of the output of the optical multiplexing circuit 13 is expressed as follows:

$$Ps1 = Vs^2/R \quad (4)$$

where R is an input impedance of the light source 14. Under the condition that the outputs of the three FM batch conversion circuits 12 are input to the optical multiplexing circuit 13, the signal power Pst of the output of the optical multiplexing circuit 13 is expressed as follows:

$$Pst = (Vst)^2/R = 9Vs^2/R \quad (5)$$

Therefore, the electric-power ratio between the signal power Ps1 and the signal power Ps3 is expressed as follows:

$$10 \log(Pst/Ps1) = 20 \log(3) \ [dB] \quad (6)$$

On the other hand, let the electric powers of noise components output from the three FM batch conversion circuits 12 be designated as Pn1, Pn2, and Pn3, respectively, and let Pn1=Pn2=Pn3=Pn. Since an electric-power addition is applied to noise components, the sum total Pnt of the electric powers of noise components output from the optical multiplexing circuit 13 is expressed as follows:

$$Pnt = Pn1 + Pn2 + Pn3 = 3Pn \quad (7)$$

If the output of only one of the three FM batch conversion circuits 12 is input to the optical multiplexing circuit 13, the noise power Pn1 output from the optical multiplexing circuit 13 is expressed as follows:

$$Pn1 = Pn \quad (8)$$

Therefore, the electric-power ratio between the noise power Pn1 and the noise power Pnt is expressed as follows:

$$10 \log(Pnt/Pn1) = 10 \log(3) \ [dB] \quad (9)$$

From this fact, it is understood that, in a case in which the three FM batch conversion circuits are used, the signal power ratio becomes equal to 20 log(3) [dB], but the noise power ratio becomes equal to 10 log(3) [dB], and hence the signalto-noise power in the output of the optical multiplexing circuit is improved by 10 log(3) [dB] in comparison with a case in which only one of the three FM batch conversion circuits is used. Although the structure using the three FM batch conversion circuits is shown in the embodiment of FIG. 5, the signal-to-noise power can be improved by using two or more FM batch conversion circuits. In a case in which N FM batch conversion circuits are used (N is an integer which is two or greater), the signal-to-noise power can be improved by 10 log(N) [dB] in comparison with a case in which only one FM batch conversion circuit is used.

With regard to distortions, the three FM batch conversion circuits are different from each other in distortion characteristics, and, if they have distortion characteristics opposite in direction, offsetting can be achieved in proportion to opposite distortions by a wave combination, and hence the distortions can be made lower than a case in which only one FM batch conversion circuit is used.

Figure 1:
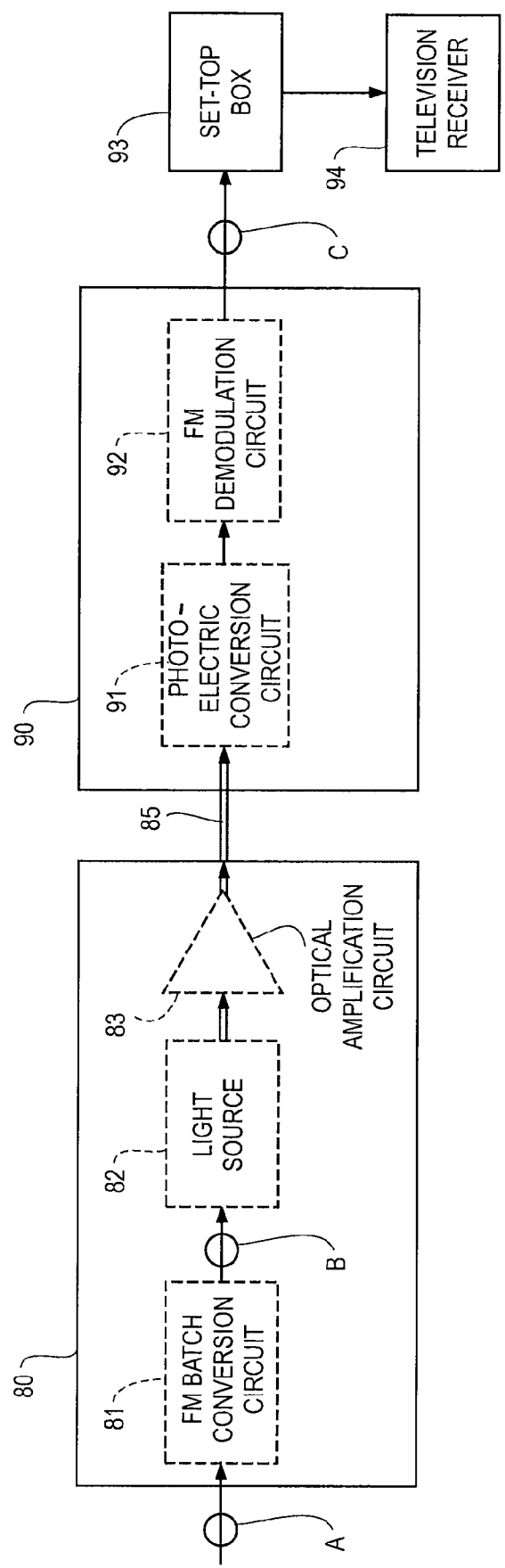
FIG. 1 is a block diagram showing a structure of a conventional optical signal transmitter and a conventional optical signal transmission system using an FM batch conversion method.

If the optical signal transmitter 10 of FIG. 5, instead of the optical transmitter 80, is applied to the optical signal transmission system in FIG. 1, the minimum light-receiving electric power of the optical signal receiver can be reduced, and the transmission distance can be lengthened, and the optical branching ratio can be enlarged between the optical signal transmitter and the optical signal receiver. Additionally, if low distortion characteristics can be realized by the optical signal transmitter, the quality of receiving video signals can be improved.

Although the signal of FIG. 2A is used as an example of a signal to be input to the optical signal transmitter in this embodiment, the invention is not limited to this signal form.

Figure 6:
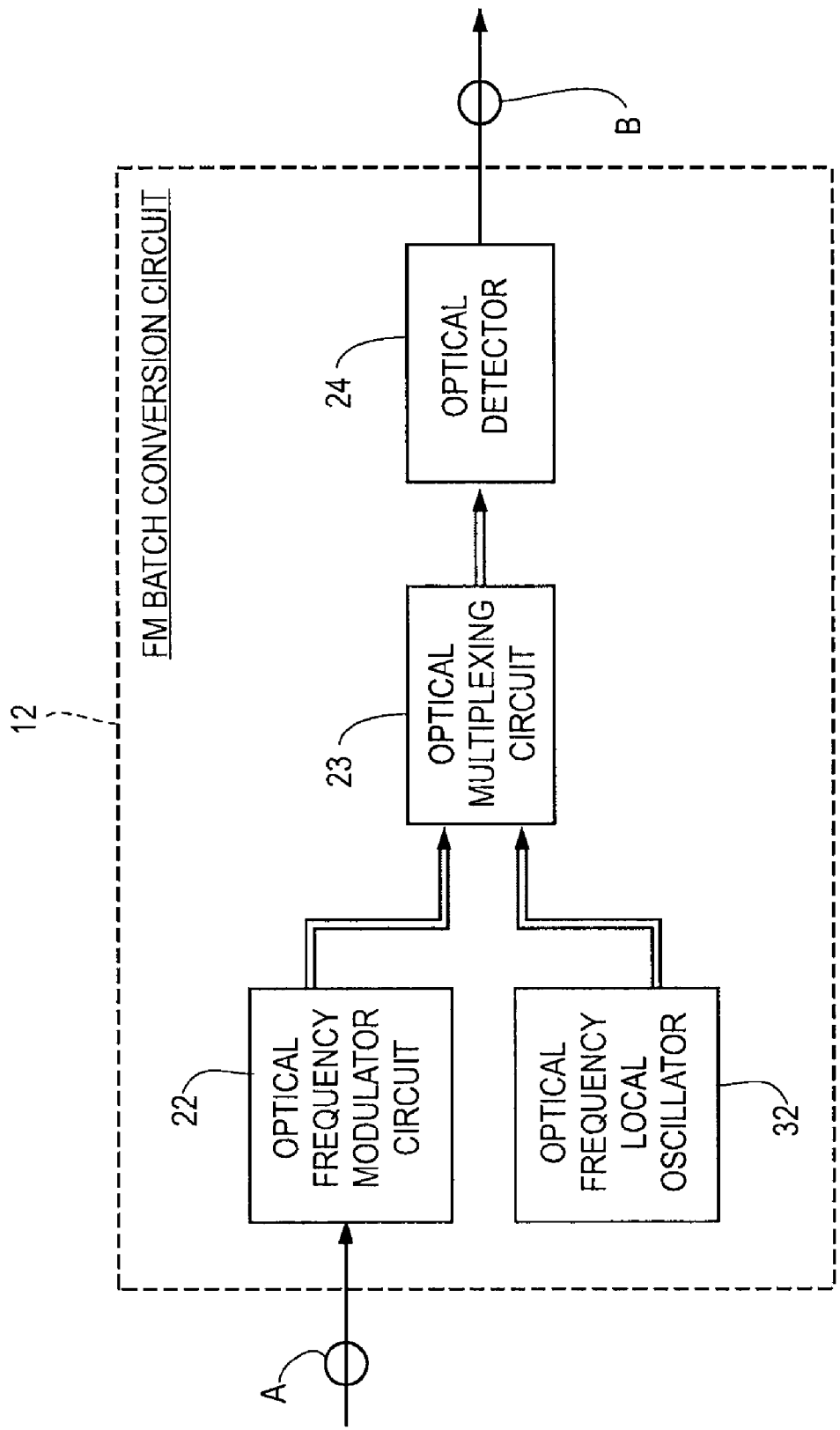
FIG. 6 is a block diagram showing a structure of an FM batch conversion circuit that is applied to an optical signal transmitter and that uses an optical frequency modulation portion.

Next, a second embodiment of the present invention is a structure of an FM batch conversion circuit that is applied to the optical signal transmitter described in the first embodiment and that uses an optical frequency modulation portion. This embodiment of the present invention is shown in FIG. 6. In FIG. 6, the FM batch conversion circuit 12 includes an optical frequency modulation portion 22, an optical frequency local oscillation portion 32, an optical multiplexing portion 23, and an optical detector 24.

In the FM batch conversion circuit 12, when the frequency-multiplexed video signals shown in FIG. 2A are subjected to frequency modulation by use of the carrier light source having an optical frequency fo in the optical frequency modulation portion 22, the optical frequency Ffmld of an optical signal in the output of the optical frequency modulation portion 22 is calculated from Equation (1) mentioned above where δf is a frequency deviation. In Equation (1), the modulated signal is a signal having a frequency fs. A DFB-LD (Distributed Feed-Back Laser Diode) can be used as the carrier light source of the optical frequency modulation portion 22.

In the optical frequency local oscillation portion 32, oscillation is performed by use of an oscillating light source having an optical frequency f1, and the signal is multiplexed with an optical signal emitted from the optical frequency modulation portion 22 by the optical multiplexer 23. The DFB-LD can be used as the oscillating light source of the optical frequency local oscillation portion 32. The two optical signals multiplexed by the optical multiplexer 23 are subjected to heterodyne detection by the optical detector 24. A photodiode that functions as a heterodyne detector can be used as the optical detector. The frequency f of the electric signal subjected to heterodyne detection by the optical detector 24 is calculated from Equation (2) mentioned above. In Equation (2), the modulated signal is a signal having a frequency fs. Herein, if the optical frequency of the carrier light source of the optical frequency modulation portion 22 and the optical frequency of the oscillating light source of the local oscillation portion 32 are caused to come close to each other, it is possible to obtain an electric signal in which frequency is modulated to have an intermediate frequency $fi=fo-f1$ of several GHz and have a frequency deviation δf as shown in FIG. 2B.

Generally, the modulation by an input electric current allows the DFB-LD to have an optical frequency varied in the range of several GHz in accordance with the input electric current, and hence a value of several GHz can be obtained as the frequency deviation δf. For example, multichannel AM video signals or QAM video signals that have undergone frequency multiplication so as to have a frequency range of about 90 MHz to about 750 MHz can be converted by the FM batch conversion circuit into a frequency-modulated signal having a frequency band of about 6 GHz in which the intermediate frequency $fi=fo-f1$ becomes equal to about 3 GHz as shown in FIG. 2B.

Further, each intermediate frequency fi, which is a frequency equal to a difference between the optical frequency of the carrier light source of the optical frequency modulation portion 22 and the optical frequency of the oscillating light source of the optical frequency local oscillation portion 32 used in N FM batch conversion circuits, is set to be substantially equal in the N FM batch conversion circuits, and frequency modulation is performed with substantially the same frequency deviation centering on this intermediate frequency. Further, the N FM batch conversion circuits are set to be substantially identical to each other in the phase of each output. Thus, the output of the optical multiplexing circuit 13 of FIG. 5 has its noise quantity expressed as the sum total of electric powers, i.e., as an electric-power addition and has its signal component expressed as the sum total of voltages, i.e., as a voltage addition. For example, the length of a transmission path, such as an optical fiber, can be adjusted, or a phase adjuster can be used, in order to set them so that the phase of each output becomes mutually identical.

From this fact, it is understood that, when use is made of an optical signal transmitter that uses N sets of optical frequency modulation portions and optical frequency local oscillation portions, the signal power ratio becomes 20 log(N) [dB], but the noise power ratio becomes 10 log(N) [dB], and hence the signal-to-noise power in the output of the optical multiplexing circuit 13 of FIG. 5 is improved by 10 log(N) [dB] in comparison with a case in which use is made of an optical signal transmitter that uses one set of an optical frequency modulation portion and an optical frequency local oscillation portion.

With regard to distortions, the N sets of optical frequency modulation portions are different from each other in distortion characteristics, and, if they have distortion characteristics opposite in direction, offsetting can be achieved in proportion to opposite distortions by a wave combination, and hence the distortions can be made lower than a case in which only one FM batch conversion circuit is used.

If the thus formed N FM batch conversion circuits are applied to an optical signal transmitter, the minimum light-receiving electric power of an optical signal receiver in an optical signal transmission system can be reduced, and the transmission distance can be lengthened, and the optical branching ratio can be enlarged between the optical signal transmitter and the optical signal receiver. Additionally, if low distortion characteristics can be obtained by the optical signal transmitter, the quality of receiving video signals can be improved.

Although the signal of FIG. 2A is used as an example of a signal to be input to the optical signal transmitter in this embodiment, the invention is not limited to this signal form.

Figure 7:
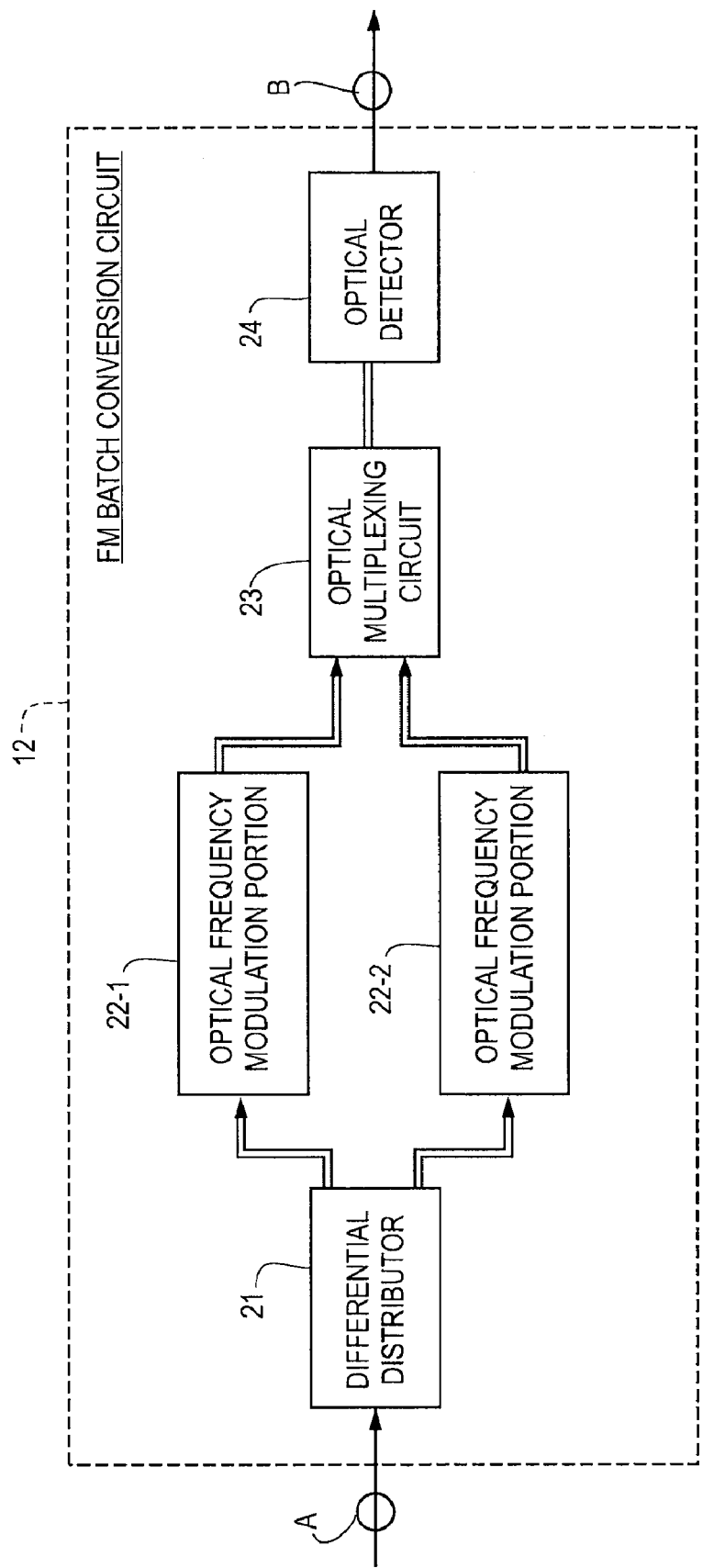
FIG. 7 is a block diagram showing a structure of an FM batch conversion circuit that is applied to an optical signal transmitter and that uses two optical frequency modulation portions for a push-pull structure.

Next, a third embodiment of the present invention is a structure of an FM batch conversion circuit that is applied to the optical signal transmitter described in the first embodiment and that uses two optical frequency modulation portions for a push-pull structure. This embodiment of the present invention is shown in FIG. 7. In FIG. 7, the FM batch conversion circuit 12 includes a differential distributor 21, an optical frequency modulation portion 22-1, an optical frequency modulation portion 22-2, an optical multiplexser 23, and an optical detector 24.

In the FM batch conversion circuit 12, a frequency-multiplexed video signal, such as that shown in FIG. 2A, is distributed by the differential distributor 21 into two electric signals whose phases have been inverted. If one of the two electric signals distributed by the differential distributor 21 is a modulated input, and if frequency modulation is performed by use of a carrier light source having an optical frequency fo1 in the optical frequency modulation portion 22-1, the optical frequency Ffmld1 of an optical signal in the output of the optical frequency modulation portion 22-1 is expressed as follows:

$$Ffmld1 = fo1 + (\delta f/2) \cdot \sin(2\pi \cdot fs \cdot t) \tag{10}$$

where $\delta f/2$ is a frequency deviation. In Equation (10), the modulated signal is a signal having a frequency fs. If the other one of the two electric signals distributed by the differential distributor is a modulated input, and if frequency modulation is performed by use of a carrier light source having an optical frequency fo2 in the optical frequency modulation portion 22-2, the optical frequency Ffmld2 of an optical signal in the output of the optical frequency modulation portion 22-2 is expressed as follows:

$$Ffmld2 = fo2 - (\delta f/2) \cdot \sin(2\pi \cdot fs \cdot t) \tag{11}$$

where $\delta f/2$ is a frequency deviation. In Equation (11), the modulated signal is a signal having a frequency fs. A DFB-LD (Distributed Feed-Back Laser Diode) can be used as a carrier light source for the optical frequency modulation portions 22-1 and 22-2.

Outputs emitted from the optical frequency modulation portions 22-1 and 22-2 are multiplexed by the optical multiplexer 23, and the two optical signals multiplexed by the optical multiplexer 23 are subjected to heterodyne detection by the optical detector 24. A photodiode that functions as a heterodyne detector can be used as the optical detector. The frequency f of the electric signal subjected to heterodyne detection by the optical detector 24 is expressed as a frequency equal to a difference between the values shown in Equations (10) and (11) as follows:

$$f = fo1 - fo2 67 f \sin(2\pi \cdot fs \cdot t) \tag{12}$$

In Equation (12), the modulated signal is a signal having a frequency fs. Herein, if the optical frequency of the carrier light source of the optical frequency modulation portion 22-1 and the optical frequency of the carrier light source of the optical frequency modulation portion 22-2 are caused to come close to each other, it is possible to obtain an electric signal in which frequency is modulated to have an intermediate frequency fi=fo–f1 of several GHz and have a frequency deviation δf as shown in FIG. 2B.

Generally, the modulation by an input electric current allows the DFB-LD to have an optical frequency varied in the range of several GHz in accordance with the input electric current, and hence a value of several GHz can be obtained as the frequency deviation δf. For example, multichannel AM video signals or QAM video signals that have undergone frequency multiplication so as to have a frequency range of about 90 MHz to about 750 MHz can be converted by the FM batch conversion circuit into a frequency-modulated signal having a frequency band of about 6 GHz in which the intermediate frequency fi=fo–f1 becomes equal to about 3 GHz as shown in FIG. 2B.

Further, each intermediate frequency fi, which is a frequency equal to a difference between the optical frequency of the carrier light source of the optical frequency modulation portion 22-1 and the optical center frequency of the carrier light source of the optical frequency modulation portion 22-2 used in N FM batch conversion circuits, is set to be substantially equal in the N FM batch conversion circuits, and frequency modulation is performed with substantially the same frequency deviation centering on this intermediate frequency. Further, the N FM batch conversion circuits are set to be substantially identical to each other in the phase of each output. Thus, the output of the optical multiplexing circuit 13 of FIG. 5 has its noise quantity expressed as the sum total of electric powers, i.e., as an electric-power addition and has its signal component expressed as the sum total of voltages, i.e., as a voltage addition. For example, the length of a transmission path, such as an optical fiber, can be adjusted, or a phase adjuster can be used, in order to set them so that the phase of each output becomes mutually identical.

From this fact, it is understood that, when use is made of an optical signal transmitter that uses N sets of optical frequency modulation portions, the signal power ratio becomes 20 log (N) [dB], however, the noise power ratio becomes 10 log(N) [dB], and hence the signal-to-noise power in the output of the optical multiplexing circuit 13 of FIG. 5 is improved by 10 log(N) [dB] in comparison with a case in which use is made of an optical signal transmitter that uses one set of optical frequency modulation portions.

With regard to distortions, the N sets of optical frequency modulation portions are different from each other in distortion characteristics, and, if they have distortion characteristics opposite in direction, offsetting can be achieved in proportion to opposite distortions by a wave combination, and hence the distortions can be made lower than a case in which only one FM batch conversion circuit is used.

If the thus formed N FM batch conversion circuits are applied to an optical signal transmitter, the minimum light-receiving electric power of an optical signal receiver in an optical signal transmission system can be reduced, and the transmission distance can be lengthened, and the optical branching ratio can be enlarged between the optical signal transmitter and the optical signal receiver. Additionally, if low distortion characteristics can be obtained by the optical signal transmitter, the quality of receiving video signals can be improved.

Although the signal of FIG. 2A is used as an example of a signal to be input to the optical signal transmitter in this embodiment, the invention is not limited to this signal form.

Figure 8:
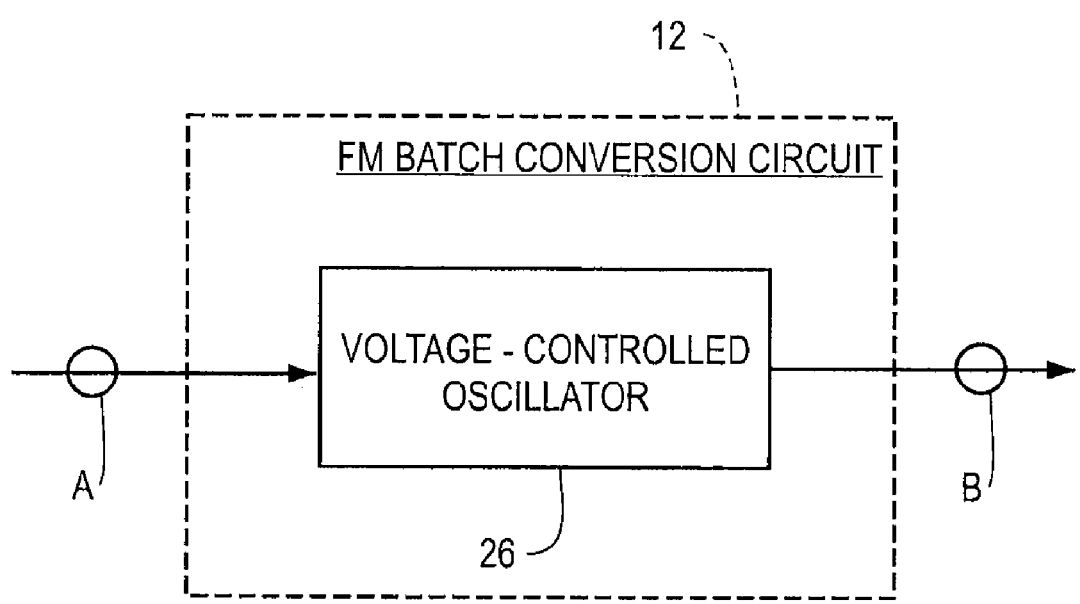
FIG. 8 is a block diagram showing a structure of an FM batch conversion circuit that is applied to an optical signal transmitter and that uses a voltage-controlled oscillator.

Next, a fourth embodiment of the present invention is an FM batch conversion circuit that is applied to the optical signal transmitter described in the first embodiment and that uses a voltage-controlled oscillator. This embodiment of the present invention is shown in FIG. 8. In FIG. 8, the FM batch conversion circuit 12 includes a voltage-controlled oscillator 26.

In the FM batch conversion circuit 12, a frequency-multiplexed video signal, such as that shown in FIG. 2A, is subjected to frequency modulation with a frequency fo as the center frequency in the voltage-controlled oscillator 26, and a frequency fv of an electric signal that has been output is expressed as follows when the frequency deviation is δf:

$$fv = fo\delta f \cdot \sin(2\pi \cdot fs \cdot t) \quad (13)$$

Thus, a frequency-modulated signal is obtained which has an intermediate frequency fi=fo and a frequency deviation δf. In Equation (13), the modulated signal is a signal having a frequency fs.

For example, multichannel AM video signals or QAM video signals that have undergone frequency multiplication so as to have a frequency range of about 90 MHz to about 750 MHz can be converted by the FM batch conversion circuit into a frequency-modulated signal having a frequency band of about 6 GHz in which the intermediate frequency fi=fo−f1 becomes equal to about 3 GHz as shown in FIG. 2B.

Further, each intermediate frequency fi of the voltage-controlled oscillator 26 used in N FM batch conversion circuits, is set to be substantially equal in the N FM batch conversion circuits, and frequency modulation is performed with substantially the same frequency deviation centering on this intermediate frequency. Further, the N FM batch conversion circuits are set to be substantially identical to each other in the phase of each output. Thus, the output of the optical multiplexing circuit 13 of FIG. 5 has its noise quantity expressed as the sum total of electric powers, i.e., as an electric-power addition and has its signal component expressed as the sum total of voltages, i.e., as a voltage addition. For example, the length of a transmission path, such as an optical fiber, can be adjusted, or a phase adjuster can be used, in order to set them so that the phase of each output becomes mutually identical.

From this fact, it is understood that, when use is made of an optical signal transmitter that uses N voltage-controlled oscillators, the signal power ratio becomes 20 log(N) [dB], however, the noise power ratio becomes 10 log(N) [dB], and hence the signal-to-noise power in the output of the optical multiplexing circuit 13 of FIG. 5 is improved by 10 log(N) [dB] in comparison with a case in which use is made of an optical signal transmitter that uses only one voltage-controlled oscillator.

With regard to distortions, the N voltage-controlled oscillators are different from each other in distortion characteristics, and, if they have distortion characteristics opposite in direction, offsetting can be achieved in proportion to opposite distortions by a wave combination, and hence the distortions can be made lower than a case in which only one FM batch conversion circuit is used.

If the thus formed N FM batch conversion circuits are applied to an optical signal transmitter, the minimum light-receiving electric power of an optical signal receiver in an optical signal transmission system can be reduced, and the transmission distance can be lengthened, and the optical branching ratio can be enlarged between the optical signal transmitter and the optical signal receiver. Additionally, if low distortion characteristics can be obtained by the optical signal transmitter, the quality of receiving video signals can be improved.

Although the signal of FIG. 2A is used as an example of a signal to be input to the optical signal transmitter in this embodiment, the invention is not limited to this signal form.

Figure 9:
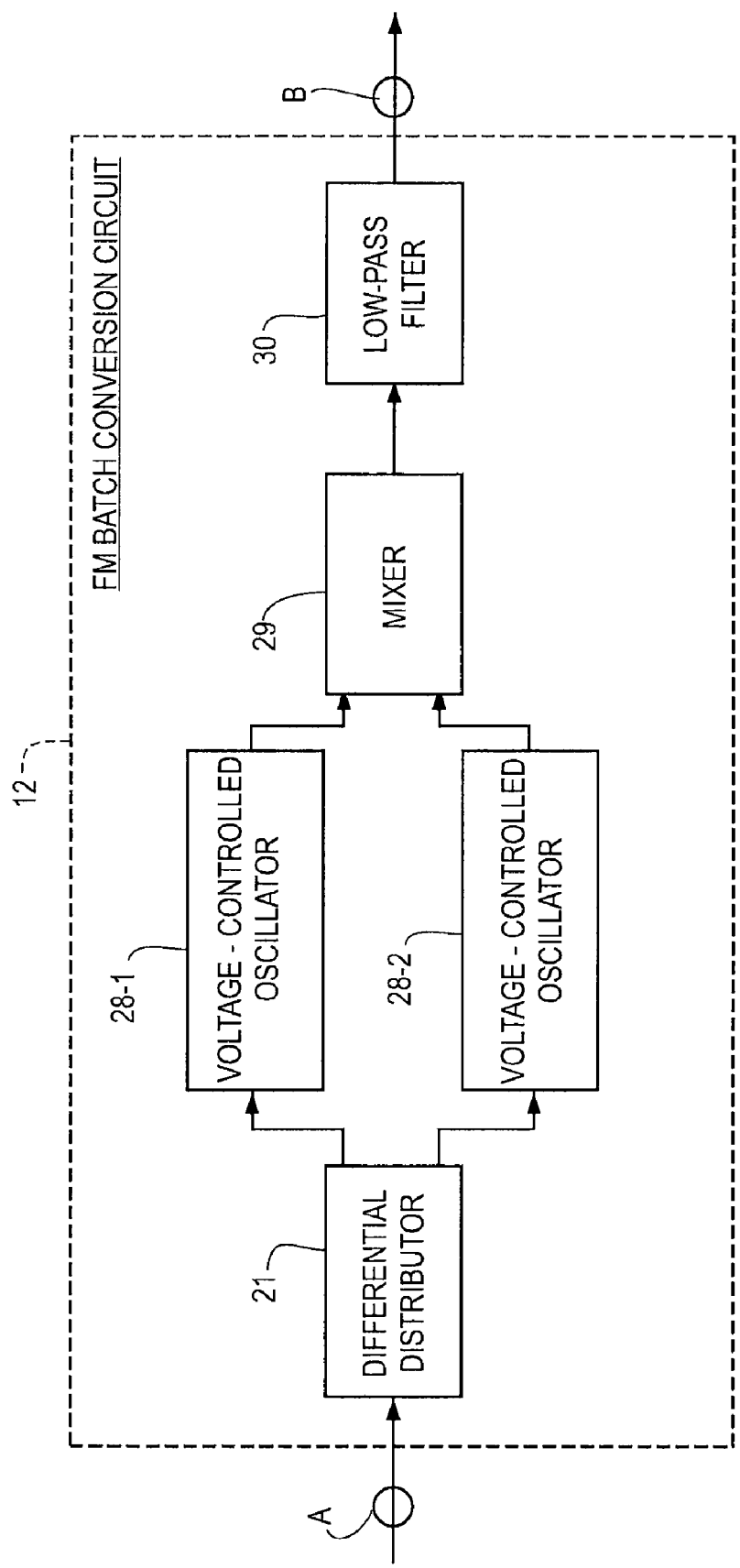
FIG. 9 is a block diagram showing a structure of an FM batch conversion circuit that is applied to an optical signal transmitter and that uses two voltage-controlled oscillators for a push-pull structure.

Next, a fifth embodiment of the present invention is an FM batch conversion circuit that is applied to the optical signal transmitter described in the first embodiment and that uses two voltage-controlled oscillators for a push-pull structure. This embodiment of the present invention is shown in FIG. 9. In FIG. 9, the FM batch conversion circuit 12 includes a differential distributor 21, a voltage-controlled oscillator 28-1, a voltage-controlled oscillator 28-2, a mixer 29, and a low-pass filter 30.

In the FM batch conversion circuit 12, a frequency-multiplexed video signal, such as that shown in FIG. 2A, is distributed by the differential distributor 21 into two electric signals in which phases have been inverted. If one of the two electric signals distributed by the differential distributor 21 is subjected to frequency modulation with a frequency fo as the center frequency in the voltage-controlled oscillator 28-1, a frequency fv1 of an electric signal output therefrom is expressed as follows:

$$fv1 = fo1 + (\delta f/2) \cdot \sin(2\pi \cdot fs \cdot t) \quad (14)$$

where πf/2 is a frequency deviation. Thus, a frequency-modulated signal which has an intermediate frequency fi=fo1 and a frequency deviation δf/2 is obtained. In Equation (14), the modulated signal is a signal having a frequency fs. If the other one of the two electric signals distributed by the differential distributor 21 is a modulated input, and is subjected to frequency modulation with a frequency fo1 as the center frequency in the voltage-controlled oscillator 28-2, a frequency fv2 of an electric signal output therefrom is expressed as follows:

$$fv2 = fo2 - (\delta f/2) \cdot \sin(2\pi \cdot fs \cdot t) \quad (15)$$

where δf/2 is a frequency deviation. Thus, a frequency-modulated signal which has an intermediate frequency fi=fo2 and a frequency deviation δf/2 is obtained. In Equation (15), the modulated signal is a signal having a frequency fs.

Outputs from the voltage-controlled oscillators 28-1 and 28-2 are mixed together by the mixer 29. The two electric signals mixed together by the mixer 29 are then smoothed by the low-pass filter 30. The frequency f of the electric signal smoothed by the low-pass filter 30 that transmits an electric signal having a frequency equal to a difference between the intermediate frequency fo1 and the intermediate frequency fo2 is expressed as that of an electric signal having a frequency equal to a difference between the value of Equation (14) and the value of Equation (15) as follows:

$$f = fo1 - fo2 + \delta f \cdot \sin(2\pi \cdot fs \cdot t) \quad (16)$$

In Equation (16), the modulated signal is a signal having a frequency fs. Herein, it is possible to obtain an electric signal whose frequency is modulated to have an intermediate frequency fi=fo1−fo2 of several GHz and have a frequency deviation δf as shown in FIG. 2B.

For example, multichannel AM video signal or QAM video signal that have undergone frequency multiplication so as to have a frequency range of about 90 MHz to about 750 MHz can be converted by the FM batch conversion circuit into a frequency-modulated signal having a frequency band of about 6 GHz in which the intermediate frequency fi=fo−f1 becomes equal to about 3 GHz as shown in FIG. 2B.

Further, each intermediate frequency fi, which is a frequency equal to a difference between the voltage-controlled oscillator 28-1 and the voltage-controlled oscillator 28-2 used in N FM batch conversion circuits, is set to be substantially equal in the N FM batch conversion circuits, and frequency modulation is performed with substantially the same frequency deviation centering on this intermediate frequency. Further, the N FM batch conversion circuits are set to be substantially identical to each other in the phase of each output. Thus, the output of the optical multiplexing circuit 13 of FIG. 5 has its noise quantity expressed as the sum total of electric powers, i.e., as an electric-power addition and has its signal component expressed as the sum total of voltages, i.e., as a voltage addition. For example, the length of a transmission path, such as an optical fiber, can be adjusted, or a phase adjuster can be used, in order to set them so that the phase of each output becomes mutually identical.

From this fact, it is understood that, when use is made of an optical signal transmitter that uses N voltage-controlled oscillators, the signal power ratio becomes 20 log(N) [dB], but the noise power ratio becomes 10 log(N) [dB], and hence the signal-to-noise power in the output of the optical multiplexing circuit 13 of FIG. 5 is improved by 10 log(N) [dB] in comparison with a case in which use is made of an optical signal transmitter that uses only one voltage-controlled oscillator.

With regard to distortions, the N optical frequency modulation portions are different from each other in distortion characteristics, and, if they have distortion characteristics opposite in direction, offsetting can be achieved in proportion to opposite distortions by a wave combination, and hence the distortions can be made lower than a case in which only one FM batch conversion circuit is used.

If the thus formed N FM batch conversion circuits are applied to an optical signal transmitter, the minimum light-receiving electric power of an optical signal receiver in an optical signal transmission system can be reduced, and the transmission distance can be lengthened, and the optical branching ratio can be enlarged between the optical signal transmitter and the optical signal receiver. Additionally, if low distortion characteristics can be obtained by the optical signal transmitter, the quality of receiving video signals can be improved.

Although the signal of FIG. 2A is used as an example of a signal to be input to the optical signal transmitter in this embodiment, the invention is not limited to this signal form.

Figure 10:
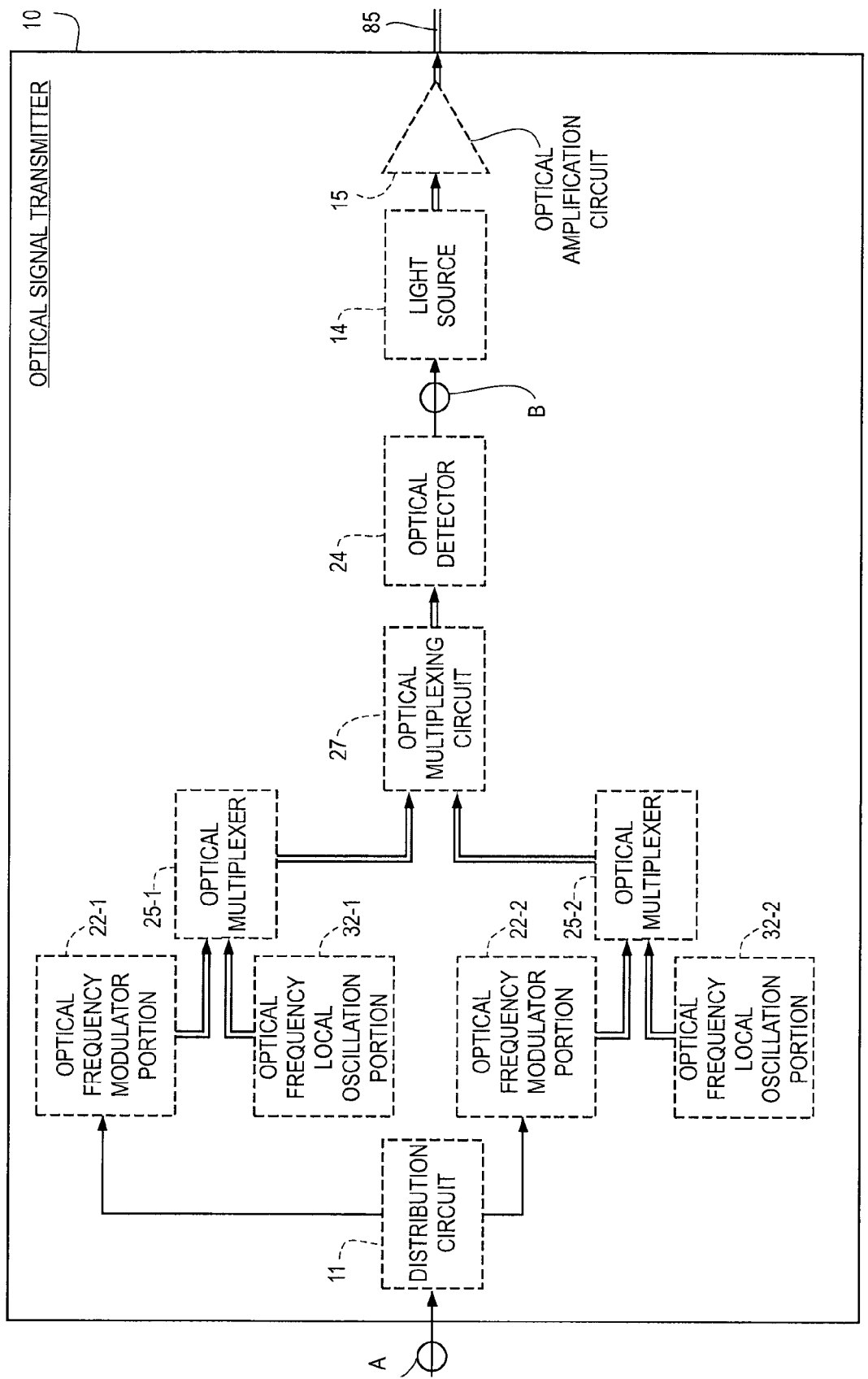
FIG. 10 is a block diagram showing a structure of an optical signal transmitter including two sets of an optical frequency modulation portion and optical frequency local oscillation portion.

Next, a sixth embodiment of the present invention is an optical signal transmitter using two sets of optical frequency modulation portions and optical frequency local oscillation portions, and is an optical signal transmission system using this optical signal transmitter. This embodiment of the present invention is shown in FIG. 10. In FIG. 10, the optical signal transmitter 10 includes a distribution circuit 11, an optical frequency modulation portion 22-1, an optical frequency modulation portion 22-2, an optical frequency local oscillation portion 32-1, an optical frequency local oscillation portion 32-2, an optical multiplexer 25-1, an optical multiplexer 25-2, an optical multiplexer 27, an optical detector 24, a light source 14 serving as a transmitting circuit, an optical amplification circuit 15, and an optical transmission path 85. The light source 14 may include a semiconductor laser and a drive circuit, which drives this semiconductor laser, serving as a transmitting circuit. The transmitting circuit may include the optical amplification circuit 15.

In FIG. 10, when multichannel AM video signals or QAM video signals that have undergone frequency multiplication so as to have a frequency range of about 90 MHz to about 750 MHz as shown in FIG. 2A are input to the optical signal transmitter 10, the signals are distributed by the distribution circuit 11 into two signal parts. One output of the distribution circuit 11 is input to the optical frequency modulation portion 22-1 as a modulated input, and is subjected to frequency modulation. The other output of the distribution circuit 11 is input to the optical frequency modulation portion 22-2 as a modulated input, and is subjected to frequency modulation.

An optical signal subjected to frequency modulation by the optical frequency modulation portion 22-1 is multiplexed with local oscillation light emitted from the local oscillation portion 32-1 by the optical multiplexer 25-1 while being caused to have the same polarization direction. Herein, the optical frequency of the optical frequency local oscillation portion 32-1 is apart from the optical center frequency of the frequency-modulated optical signal output from the optical frequency modulation portion 22-1 by a frequency substantially equal to the intermediate frequency.

An optical signal subjected to frequency modulation by the optical frequency modulation portion 22-2 is multiplexed with local oscillation light emitted from the local oscillation portion 32-2 by the optical multiplexer 25-2 while being caused to have the same polarization direction. Herein, the optical frequency of the optical frequency local oscillation portion 32-2 is apart from the optical center frequency of the frequency-modulated optical signal output from the optical frequency modulation portion 22-2 by a frequency substantially equal to the intermediate frequency.

The optical signals output from the optical multiplexers 25-1 and 25-2, respectively, are multiplexed by the optical multiplexer 27 while making the polarization direction of the optical signal output from the optical multiplexer 25-1 perpendicular to the polarization direction of the second optical signal output from the optical multiplexer 25-2, and a multiplexed signal is output therefrom. The optical signal output from the optical multiplexer 27 is subjected to heterodyne detection in the optical detector 24, and an electric signal, which has a frequency equal to a difference between the optical frequency of the optical signal emitted from the optical frequency modulation portion and the optical frequency of the local oscillation light emitted from the local oscillation portion, is output. A photodiode that performs heterodyne detection can be used as the detector 24. The output of this detector 24 is a wideband frequency-modulated electric signal as shown in FIG. 2B. This frequency-modulated electric signal is converted into an optical signal subjected to intensity modulation by the light source 14, is then amplified to a predetermined optical level by the optical amplification circuit 15, and is transmitted to the optical transmission path 85. A semiconductor laser, such as a DFB-LD, can be used as the light source.

Herein, the frequency deviations of the two optical frequency modulation portions 22-1 and 22-2 are set to be substantially equal to each other. Further, a difference between the optical frequency of the optical signal of the optical frequency modulation portion 22-1 and the optical frequency of the local oscillation light of the local oscillation portion 32-1 is set to be substantially equal to a difference between the optical frequency of the optical signal of the optical frequency modulation portion 22-2 and the optical frequency of the local oscillation light of the local oscillation portion 32-2. Further, the phase of an electric signal obtained by subjecting the multiplexed optical signal emitted from the optical multiplexer 25-1 to heterodyne detection by the optical detector 24 is set to be substantially equal to the phase of an electric signal obtained by subjecting the multiplexed optical signal emitted from the optical multiplexer 25-2 to heterodyne detection by the optical detector 24. Thereby, the electric signal detected by the optical detector 24 has its noise quantity expressed as the sum total of electric powers, i.e., as an electric-power addition and has its signal component expressed as the sum total of voltages, i.e., as a voltage addition. For example, the length of a transmission path, such as an optical fiber, can be adjusted, or a phase adjuster can be used, in order to set them so that the phase of each output becomes mutually identical.

From this fact, it is understood that, when use is made of an optical signal transmitter that uses two sets of optical frequency modulation portions and optical frequency local oscillation portions, the signal power ratio becomes 20 log(2)

[dB], however, the noise power ratio becomes 10 log(2) [dB], and hence the signal-to-noise power in the output of the optical multiplexing circuit is improved by 10 log(2) [dB] in comparison with a case in which use is made of an optical signal transmitter that uses only one set of an optical frequency modulation portion and an optical frequency local oscillation portion.

With regard to distortions, the two sets of optical frequency modulation portions are different from each other in distortion characteristics, and, if they have distortion characteristics opposite in direction, offsetting can be achieved in proportion to opposite distortions by a wave combination, and hence the distortions can be made lower than a case in which only one FM batch conversion circuit is used.

If the optical signal transmitter 10 of FIG. 10, instead of the optical transmitter 80, is applied to the optical signal transmission system in FIG. 1, the minimum light-receiving electric power of the optical signal receiver can be reduced, and the transmission distance can be lengthened, and the optical branching ratio can be enlarged between the optical signal transmitter and the optical signal receiver.

Additionally, if low distortion characteristics can be realized by the optical signal transmitter, the quality of receiving video signals can be improved.

Although the signal of FIG. 2A is used as an example of a signal to be input to the optical signal transmitter in this embodiment, the invention is not limited to this signal form.

Figure 11:
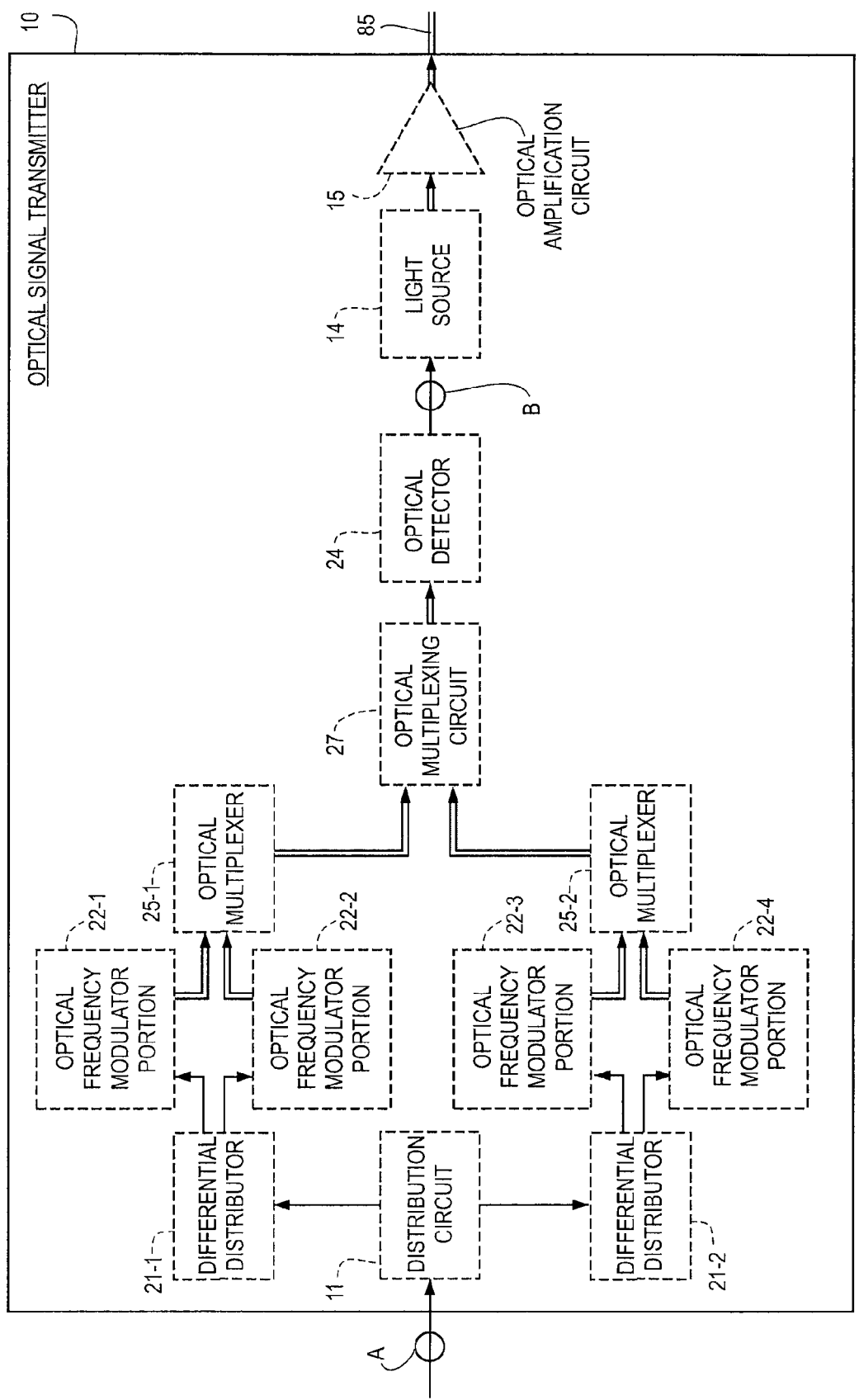
FIG. 11 is a block diagram showing a structure of an optical signal transmitter in which two optical frequency modulation portions are used for a push-pull structure and in which two push-pull structures are used.

Next, a seventh embodiment of the present invention is an optical signal transmitter including two sets of two push-pull structure optical frequency modulation portions therein, and is an optical signal transmission system using this optical signal transmitter. This embodiment of the present invention is shown in FIG. 11. In FIG. 11, the optical signal transmitter 10 comprises a distribution circuit 11, a differential distributor 21-1, a differential distributor 21-2, an optical frequency modulation portion 22-1, an optical frequency modulation portion 22-2, an optical frequency modulation portion 22-3, an optical frequency modulation portion 22-4, an optical multiplexer 25-1, an optical multiplexer 25-2, an optical multiplexer 27, an optical detector 24, a light source 14 serving as a transmitting circuit, an optical amplification circuit 15, and an optical transmission path 85. The light source 14 may include a semiconductor laser and a drive circuit that drives this semiconductor laser as a transmitting circuit, and the transmitting circuit may include the optical amplification circuit 15.

In FIG. 11, when multichannel AM video signals or QAM video signals that have undergone frequency multiplication so as to have a frequency range of about 90 MHz to about 750 MHz as shown in FIG. 2A are input to the optical signal transmitter 10, the signals are distributed by the distribution circuit 11 into two signal parts. One output of the distribution circuit 11 is distributed by the differential distributor 21-1 into two electric signals in which phases have been inverted. The optical frequency Ffmld1 of the output light emitted from the optical frequency modulation portion 22-1 is subjected to frequency modulation by one of the two electric signals emitted from the differential distributor 21-1, and thereby a frequency-modulated optical signal is output. The optical frequency Ffmld2 of the output light emitted from the optical frequency modulation portion 22-2 is subjected to frequency modulation by the other one of the two electric signals emitted from the differential distributor 21-1, and thereby a frequency-modulated optical signal is output. The frequency-modulated optical signal emitted from the optical frequency modulation portion 22-1 and the frequency-modulated optical signal emitted from the optical frequency modulation portion 22-2 are set so that a difference in the optical center frequency becomes substantially equal to an intermediate frequency and so that coincidence of the polarization direction is achieved, are then multiplexed by the optical multiplexer 25-1, and are turned into a first optical signal.

The other output of the distribution circuit 11 is distributed by the differential distributor 21-2 into two electric signals in which phases have been inverted. The optical frequency Ffmld3 of the output light emitted from the optical frequency modulation portion 22-3 is subjected to frequency modulation by one of the two electric signals emitted from the differential distributor 21-2, and thereby a frequency-modulated optical signal is output. The optical frequency Ffmld4 of the output light emitted from the optical frequency modulation portion 22-4 is subjected to frequency modulation by the other one of the two electric signals emitted from the differential distributor 21-2, and thereby a frequency-modulated optical signal is output. The frequency-modulated optical signal emitted from the optical frequency modulation portion 22-3 and the frequency-modulated optical signal emitted from the optical frequency modulation portion 22-4 are set so that a difference in the optical center frequency becomes substantially equal to an intermediate frequency and so that coincidence of the polarization direction is achieved, are then multiplexed by the optical multiplexer 25-2, and are turned into a second optical signal.

The first optical signal output from the optical multiplexers 25-1 and the second optical signal output from the optical multiplexers 25-2, are multiplexed by the optical multiplexer 27 while making the polarization direction of the first optical signal perpendicular to the polarization direction of the second optical signal respectively, and a multiplexed signal is output. The optical signal output from the optical multiplexer 27 is subjected to heterodyne detection in the optical detector 24, and an electric signal is output. This electric signal has a frequency equal to a difference between the optical frequency of the frequency-modulated optical signal emitted from the optical frequency modulation portion 22-1 and the optical frequency of the frequency-modulated optical signal emitted from the optical frequency modulation portion 22-2 and equal to a difference between the optical frequency of the frequency-modulated optical signal emitted from the modulation portion optical frequency 22-3 and the optical frequency of the frequency-modulated optical signal emitted from the optical frequency modulation portion 22-4. A photodiode that performs heterodyne detection can be used as the detector 24. The output of this detector 24 is a wideband frequency-modulated electric signal as shown in FIG. 2B. This frequency-modulated electric signal is converted into an optical signal subjected to intensity modulation by the light source 14, is then amplified to a predetermined optical level by the optical amplification circuit 15, and is transmitted to the optical transmission path 85. A semiconductor laser, such as a DFB-LD, can be used as the light source.

Herein, the frequency deviations of the optical frequency modulation portion 22-1, the optical frequency modulation portion 22-2 the optical frequency modulation portion 22-3, and the optical frequency modulation portion 22-4 are set to be substantially equal to each other. Also, the phase of an electric signal obtained by subjecting the multiplexed optical signal emitted from the optical multiplexer 25-1 to heterodyne detection by the optical detector 24 is set to be substantially equal to the phase of an electric signal obtained by subjecting the multiplexed optical signal emitted from the optical multiplexer 25-2 to heterodyne detection by the optical detector 24. Thereby, the electric signal detected by the optical detector 24 has its noise quantity expressed as the sum total of electric powers, i.e., as an electric-power addition and has its signal component expressed as the sum total of voltages, i.e., as a voltage addition. For example, the length of a transmission path, such as an optical fiber, can be adjusted, or a phase adjuster can be used, in order to set them so that the phase of each output becomes mutually identical.

From this fact, it is understood that, when use is made of an optical signal transmitter that uses two sets of optical frequency modulation portions, in which each set consisting of two optical frequency modulation portions serves as a push-pull structure, the signal power ratio becomes 20 log(2) [dB], however, the noise power ratio becomes 10 log(2) [dB], and hence the signal-to-noise power in the output of the optical multiplexing circuit is improved by 10 log(2) [dB] in comparison with a case in which use is made of an optical signal transmitter that uses only one set of two optical frequency modulation portions serving as a push-pull structure.

With regard to distortions, the two optical frequency modulation portions serving as a push-pull structure are different from each other in distortion characteristics, and, if they have distortion characteristics opposite in direction, offsetting can be achieved in proportion to opposite distortions by a wave combination, and hence the distortions can be made lower than a case in which only one FM batch conversion circuit is used.

If the optical signal transmitter 10 of FIG. 11, instead of the optical transmitter 80, is applied to the optical signal transmission system in FIG. 1, the minimum light-receiving electric power of the optical signal receiver can be reduced, and the transmission distance can be lengthened, and the optical branching ratio can be enlarged between the optical signal transmitter and the optical signal receiver.

Additionally, if low distortion characteristics can be realized by the optical signal transmitter, the quality of receiving video signals can be improved.

Although the signal of FIG. 2A is used as an example of a signal to be input to the optical signal transmitter in this embodiment, the invention is not limited to this signal form.

Figure 12:
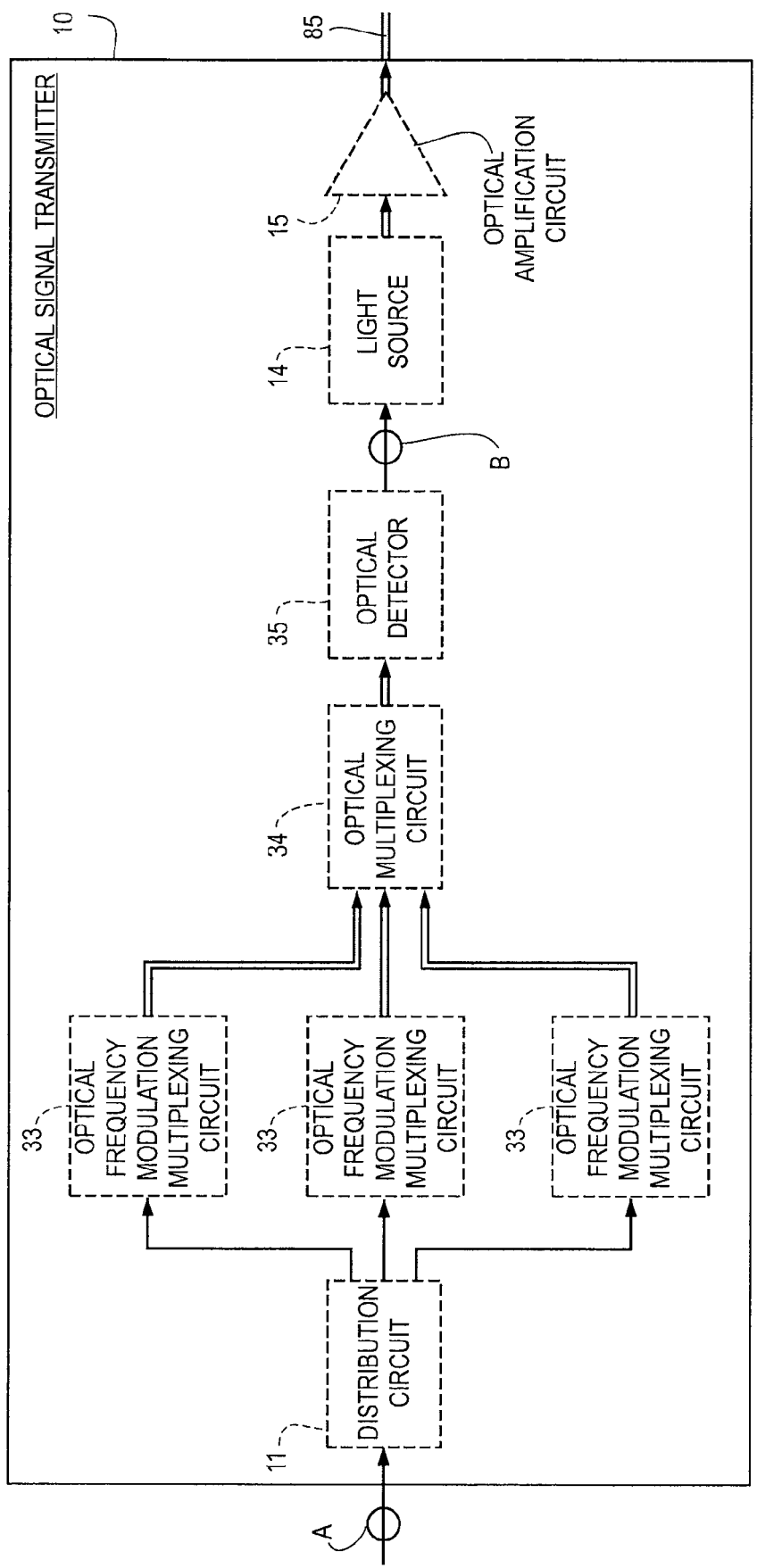
FIG. 12 is a block diagram showing a structure of an optical signal transmitter in which N optical frequency modulation multiplexing circuits, to which electric signals distributed by a distribution circuit are input while being modulated, are used.
Figure 13:
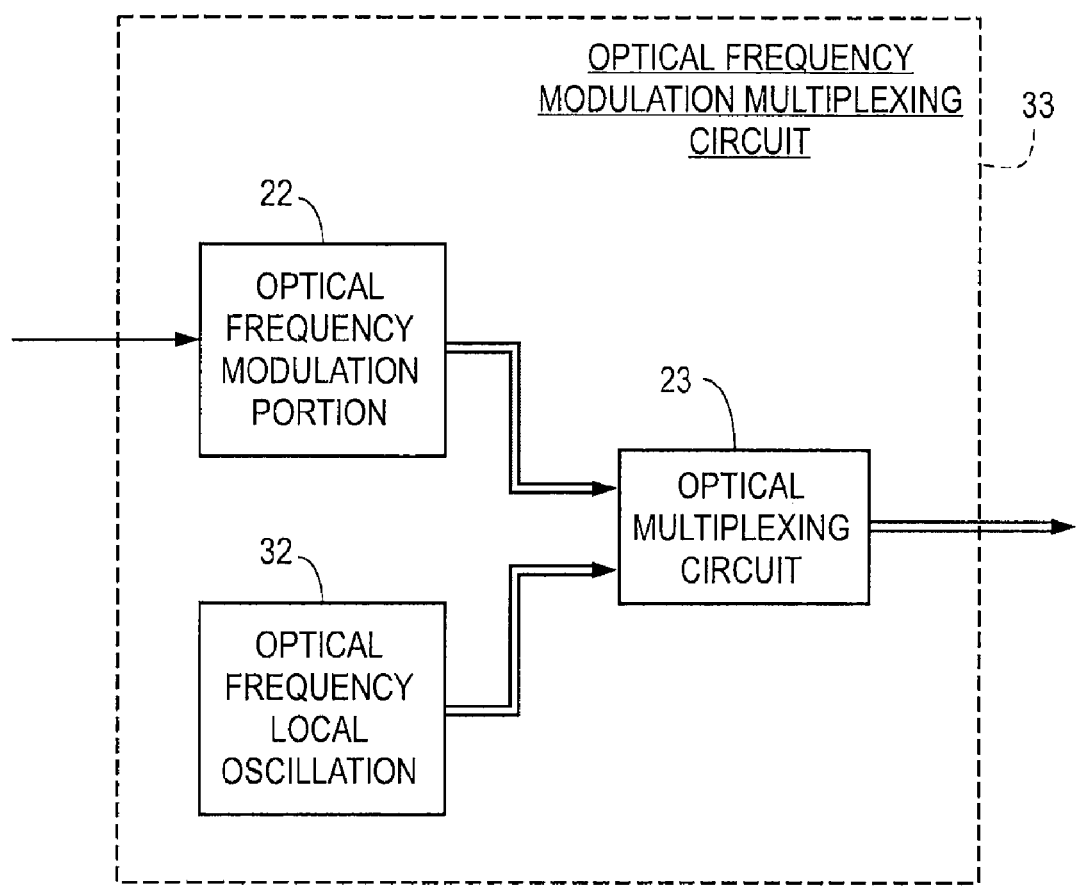
FIG. 13 is a block diagram showing a structure of the optical frequency modulation multiplexing circuit.

Next, an eighth embodiment of the present invention is an optical signal transmitter that uses N optical frequency modulation multiplexing circuits to which electric signals distributed by a distribution circuit are input while being modulated, and is an optical signal transmission system using this optical signal transmitter. This embodiment of the present invention is shown in FIG. 12. In FIG. 12, the optical signal transmitter 10 comprises a distribution circuit 11, an optical frequency modulation multiplexing circuit 33, an optical multiplexing circuit 34, an optical detection circuit 35, a light source 14 serving as a transmitting circuit, an optical amplification circuit 15, and an optical transmission path 85. The light source 14 may include a semiconductor laser and a drive circuit that drives this semiconductor laser as a transmitting circuit, and the transmitting circuit may include the optical amplification circuit 15. A structure of the optical frequency modulation multiplexing circuit 33 is shown in FIG. 13. In FIG. 13, the optical frequency modulation multiplexing circuit 33 comprises an optical frequency modulation portion 22, an optical frequency local oscillation portion 32, and an optical multiplexer 23.

In FIG. 12, when multichannel AM video signals or QAM video signals that have undergone frequency multiplication so as to have a frequency range of about 90 MHz to about 750 MHz as shown in FIG. 2A are input to the optical signal transmitter 10, the signals are distributed by the distribution circuit 11 into N signal parts. FIG. 12 shows a case in which N=3. The output of the distribution circuit 11 is input to each of the N optical frequency modulation multiplexing circuits 33 as a modulated input, and is subjected to frequency modulation by the optical frequency modulation portion 22 shown in FIG. 13.

In the optical frequency modulation multiplexing circuit 33 shown in FIG. 13, the optical frequency modulation portion 22 outputs a frequency-modulated optical signal, and the optical frequency local oscillation portion 32 outputs an optical local oscillation signal having a frequency apart from the optical frequency of the optical signal output from the optical frequency modulation portion 22 by a frequency substantially equal to the intermediate frequency. The frequency-modulated optical signal and the output from the optical frequency local oscillation portion 32 are multiplexed by the optical multiplexer 23.

The multiplexed optical signals output from the three optical frequency modulation multiplexing circuits 33 are multiplexed by the optical multiplexing circuit 34, are then subjected to heterodyne detection by the optical detection circuit 35, and are turned into an electric signal having a frequency equal to a difference between the optical frequency of the frequency-modulated optical signal emitted from the optical frequency modulation portion and the optical frequency of the optical local oscillation signal emitted from the optical frequency local oscillation portion. A photodiode can be used as the optical detection circuit 35. The output of the optical detection circuit 35 is a wideband frequency-modulated electric signal as shown in FIG. 2B. This frequency-modulated electric signal is converted into an optical signal subjected to intensity modulation by the light source 14, is then amplified to a predetermined optical level by the optical amplification circuit 15, and is transmitted to the optical transmission path 85. A semiconductor laser, such as a DFB-LD, can be used as the light source.

Herein, the frequency deviations of the N optical frequency modulation multiplexing circuits are set to be substantially equal to each other. Further, the phases of electric signals obtained by subjecting the optical signals emitted from the N optical frequency modulation multiplexing circuits 33 to heterodyne detection by the optical detection circuit 35 are set to be substantially equal to each other. Thereby, the electric signals detected by the optical detection circuit 35 have a noise quantity expressed as the sum total of electric powers, i.e., as an electric-power addition and have a signal component expressed as the sum total of voltages, i.e., as a voltage addition. For example, the length of a transmission path, such as an optical fiber, can be adjusted, or a phase adjuster can be used, in order to set them so that the phase of each output becomes mutually identical.

From this fact, it is understood that, when use is made of an optical signal transmitter that uses N optical frequency modulation multiplexing circuits, the signal power becomes 20 log(N), however, the noise power becomes 10 log(N), and hence the signal-to-noise power in the output of the optical multiplexing circuit is improved by 10 log(N) [dB] in comparison with a case in which use is made of an optical signal transmitter that uses only one optical frequency modulation multiplexing circuit.

With regard to distortions, the N optical frequency modulation portions are different from each other in distortion characteristics, and, if they have distortion characteristics opposite in direction, offsetting can be achieved in proportion to opposite distortions by a wave combination, and hence the distortions can be reduced.

If the optical signal transmitter 10 of FIG. 12, instead of the optical transmitter 80, is applied to the optical signal transmission system in FIG. 1, the minimum light-receiving electric power of the optical signal receiver can be reduced, and the transmission distance can be lengthened, and the optical branching ratio can be enlarged between the optical signal transmitter and the optical signal receiver. Additionally, if low distortion characteristics can be realized by the optical signal transmitter, the quality of receiving video signals can be improved.

Although the signal of FIG. 2A is used as an example of a signal to be input to the optical signal transmitter in this embodiment, the invention is not limited to this signal form.

Figure 14:
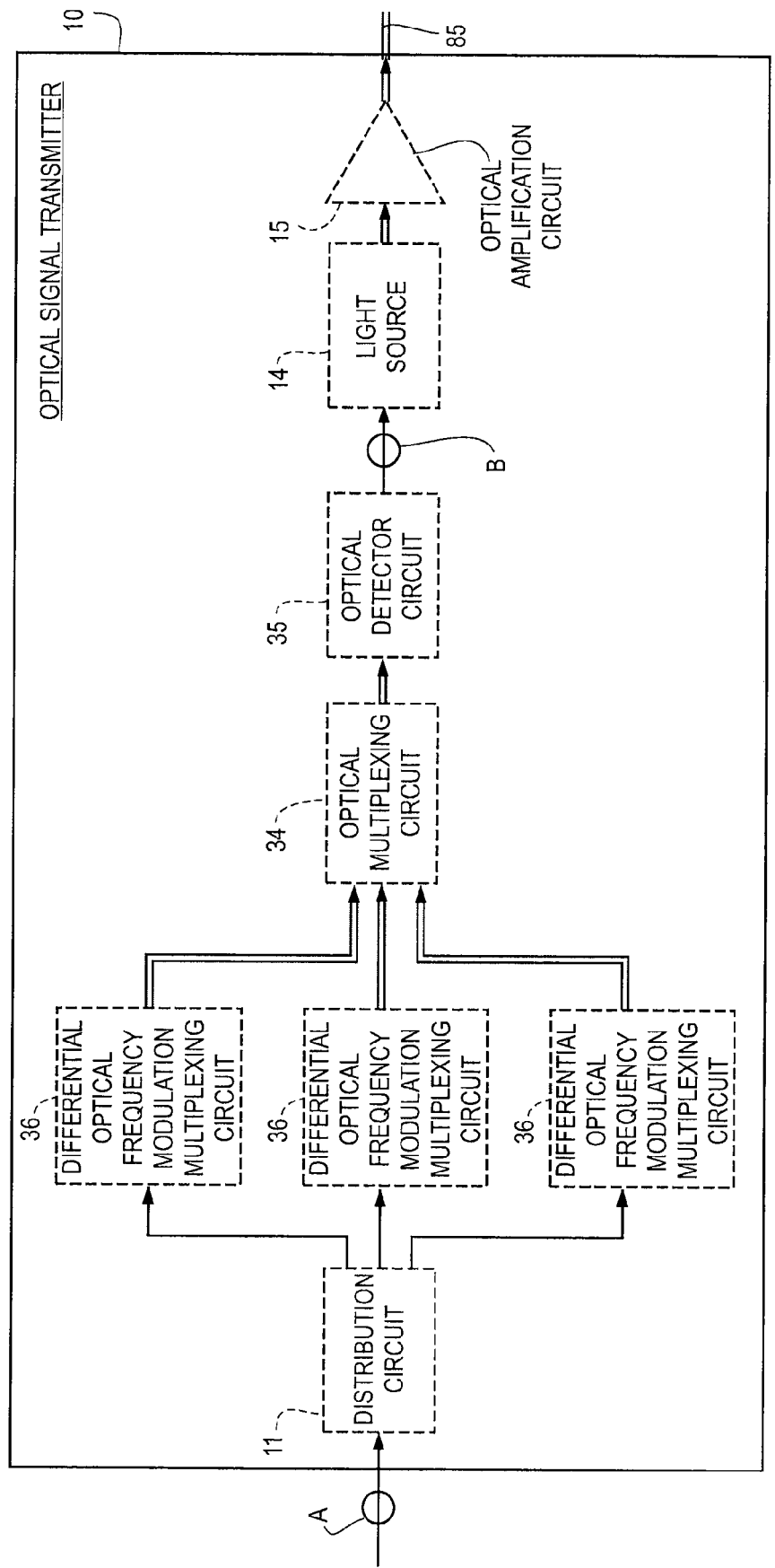
FIG. 14 is a block diagram showing a structure of an optical signal transmitter in which N differential optical frequency modulation multiplexing circuits, to which electric signals distributed by a distribution circuit are input while being modulated, are used.
Figure 15:
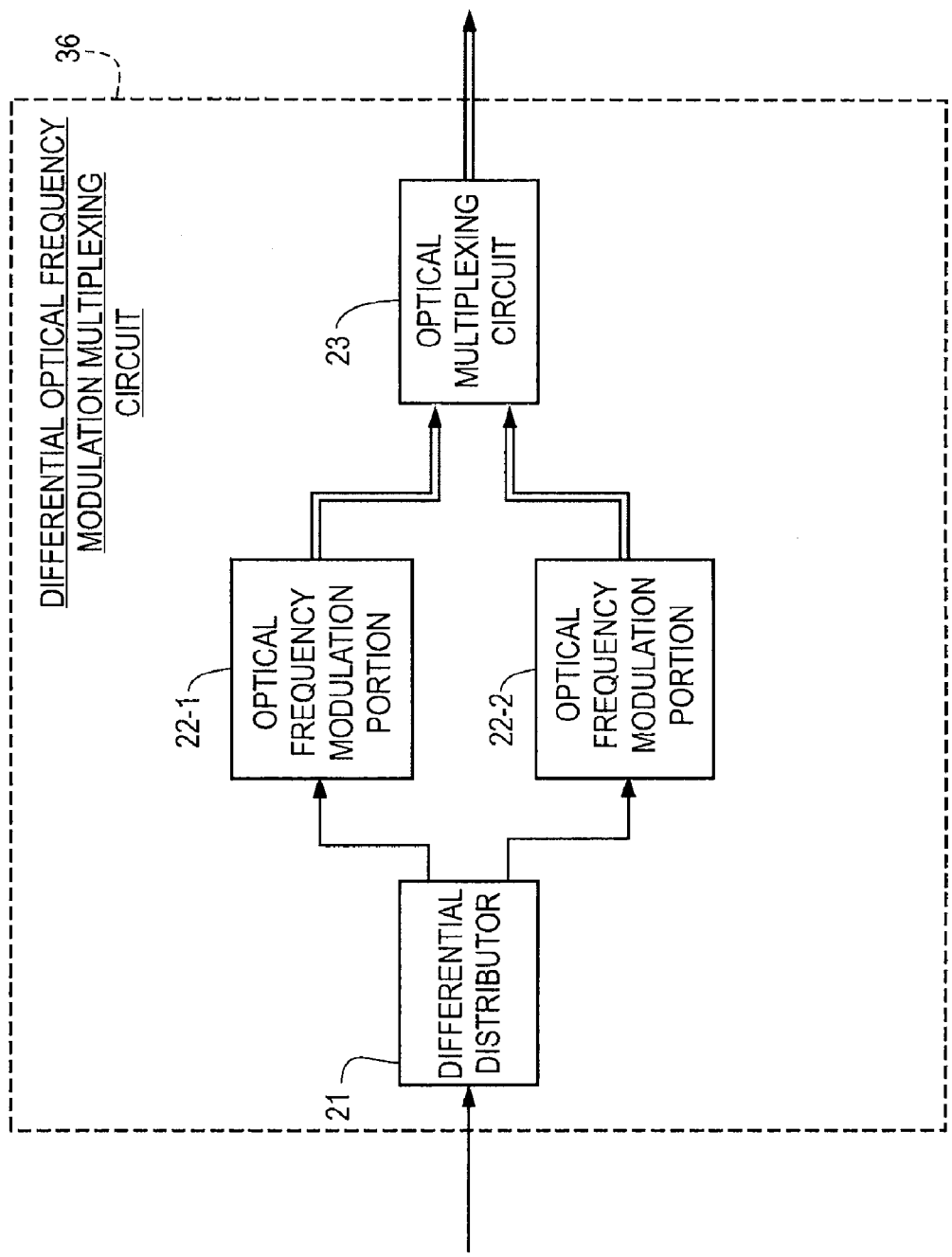
FIG. 15 is a block diagram showing a structure of the differential optical frequency modulation multiplexing circuit.

Next, a ninth embodiment of the present invention is an optical signal transmitter that uses N differential optical frequency modulation multiplexing circuits to which electric signals distributed by a distribution circuit are input while being modulated, and is an optical signal transmission system using this optical signal transmitter. This embodiment of the present invention is shown in FIG. 14. FIG. 14 shows a case in which N=3. In FIG. 14, the optical signal transmitter 10 comprises a distribution circuit 11, a differential optical frequency modulation multiplexing circuit 36, an optical multiplexing circuit 34, an optical detection circuit 35, a light source 14 serving as a transmitting circuit, an optical amplification circuit 15, and an optical transmission path 85. The light source 14 may include a semiconductor laser and a drive circuit that drives this semiconductor laser as a transmitting circuit, and the transmitting circuit may include the optical amplification circuit 15. A structure of the differential optical frequency modulation multiplexing circuit 36 is shown in FIG. 15. In FIG. 15, the differential optical frequency modulation multiplexing circuit 36 comprises a differential distributor 21, an optical frequency modulation portion 22-1, an optical frequency modulation portion 22-2, and an optical multiplexer 23.

In FIG. 14, when multichannel AM video signals or QAM video signals that have undergone frequency multiplication so as to have a frequency range of about 90 MHz to about 750 MHz as shown in FIG. 2A are input to the optical signal transmitter 10, the signals are distributed by the distribution circuit 11 into N signal parts. The output of the distribution circuit 11 is input to each of the N differential optical frequency modulation multiplexing circuits 36 as a modulated input.

In the differential optical frequency modulation multiplexing circuit 36 shown in FIG. 15, the output from the distribution circuit 11 is distributed by the differential distributor 21 into two electric signals in which phases have been inverted. The two electric signals are turned into frequency-modulated optical signals in the optical frequency modulation portion 22-1 and the optical frequency modulation portion 22-2, respectively. The optical frequency of an optical signal output from the optical frequency modulation portion 22-1 and the optical center frequency of an optical signal output from the optical frequency modulation portion 22-2 are apart from each other by the intermediate frequency. The frequency-modulated optical signals emitted from the optical frequency modulation portion 22-1 and the optical frequency modulation portion 22-2 are multiplexed by the optical multiplexer 23, and are output to the optical multiplexing circuit 34 shown in FIG. 14. Herein, the intermediate frequencies in the N differential optical frequency modulation multiplexing circuits 36 are set to be substantially equal to each other.

The optical signals output from the N differential optical frequency modulation multiplexing circuits 36 are multiplexed by the optical multiplexing circuit 34, are then subjected to heterodyne detection by the optical detection circuit 35, and are turned into an electric signal having a frequency equal to a difference between the optical frequency of the frequency-modulated optical signal emitted from the optical frequency modulation portion 22-1 and the optical frequency of the frequency-modulated optical signal emitted from the optical frequency modulation portion 22-2. A photodiode can be used as the optical detection circuit 35. The output of the optical detection circuit 35 is a wideband frequency-modulated electric signal as shown in FIG. 2B. This frequency-modulated electric signal is converted into an optical signal subjected to intensity modulation by the light source 14, is then amplified to a predetermined optical level by the optical amplification circuit 15, and is transmitted to the optical transmission path 85. A semiconductor laser, such as a DFB-LD, can be used as the light source.

Herein, the frequency deviations of the N differential optical frequency modulation multiplexing circuits are set to be substantially equal to each other. Further, the phases of electric signals obtained by subjecting the optical signals emitted from the N differential optical frequency modulation multiplexing circuits 36 to heterodyne detection by the optical detection circuit 35 are set to be substantially equal to each other. Thereby, the electric signals detected by the optical detection circuit 35 have a noise quantity expressed as the sum total of electric powers, i.e., as an electric-power addition and have a signal component expressed as the sum total of voltages, i.e., as a voltage addition. For example, the length of a transmission path, such as an optical fiber, can be adjusted, or a phase adjuster can be used, in order to set them so that the phase of each output becomes mutually identical.

From this fact, it is understood that, when use is made of an optical signal transmitter that uses N differential optical frequency modulation multiplexing circuits, the signal power becomes 20 log(N), however, the noise power becomes 10 log(N), and hence the signal-to-noise power in the output of the optical multiplexing circuit is improved by 10 log(N) [dB].

With regard to distortions, the 2N optical frequency modulation portions are different from each other in distortion characteristics, and, if they have distortion characteristics opposite in direction, offsetting can be achieved in proportion to opposite distortions by a wave combination, and hence the distortions can be reduced.

If the optical signal transmitter 10 of FIG. 14, instead of the optical transmitter 80, is applied to the optical signal transmission system in FIG. 1, the minimum light-receiving electric power of the optical signal receiver can be reduced, and the transmission distance can be lengthened, and the optical branching ratio can be enlarged between the optical signal transmitter and the optical signal receiver. Additionally, if low distortion characteristics can be realized by the optical signal transmitter, the quality of receiving video signals can be improved.

Although the signal of FIG. 2A is used as an example of a signal to be input to the optical signal transmitter in this embodiment, the invention is not limited to this signal form.

Additionally, the optical transmitter and the optical transmission system of the present invention can be used in a case in which the network of the optical transmission path is a passive double star topology (PDS topology), as well as a single star topology (SS topology).

The invention claimed is:

1. An optical signal transmitter for applying frequency modulation to amplitude-modulated electric signals that have undergone frequency division multiplexing to optically transmit the electric signals, the optical signal transmitter comprising:
   a distribution circuit for distributing the electric signals into a plurality of signal parts and outputting the signal parts;

a plurality of frequency modulation means for applying frequency modulation to each output of the distribution circuit and emitting each output, the plurality of frequency modulation means being substantially equal to each other in frequency deviation and in intermediate frequency and being substantially identical in phase of each output;

a multiplexing means for multiplexing outputs of the plurality of frequency modulation means and outputting multiplexed outputs; and a transmitting circuit for outputting optical signals subjected to intensity modulation by the output of the multiplexing means to an optical transmission path, wherein the distribution circuit distributes the electrical signals into two signals (N=2) and outputs these signals, the frequency modulation means includes:

a first optical frequency modulation portion for outputting a first frequency-modulated optical signal applied frequency modulation to one of the two electric signals input from the distribution circuit as a modulated input;

a first optical frequency local oscillation portion for outputting a first optical local oscillation signal having an optical frequency apart from an optical center frequency of the first frequency-modulated optical signal output from the first optical frequency modulation portion by a frequency substantially equal to an intermediate frequency;

a first optical multiplexer for multiplexing the first frequency-modulated optical signal and the first optical local oscillation signal so as to become identical in polarization direction and outputting a first multiplexed optical signal;

a second optical frequency modulation portion for outputting a second frequency-modulated optical signal applied frequency modulation to the other one of the two electric signals input from the distribution circuit as a modulated input;

a second optical frequency local oscillation portion for outputting a second optical local oscillation signal having an optical frequency apart from an optical center frequency of the second frequency-modulated optical signal output from the second optical frequency modulation portion by a frequency substantially equal to the intermediate frequency; and a second optical multiplexer for multiplexing the second frequency-modulated optical signal and the second optical local oscillation signal together so as to become identical in polarization direction and outputting a second multiplexed optical signal, the multiplexing means is a third optical multiplexer for multiplexing the first multiplexed optical signal output from the first optical multiplexer and the second multiplexed optical signal output from the second optical multiplexer so that a polarization direction of the first multiplexed optical signal becomes perpendicular to a polarization direction of the second multiplexed optical signal and outputting a third multiplexed optical signal, the optical signal transmitter further comprising:

an optical detector for applying heterodyne detection to the third multiplexed optical signal output from the third optical multiplexer and outputting an electric signal having a frequency equal to a difference between an optical frequency of the first frequency-modulated optical signal and an optical frequency of the first optical local oscillation signal and an electric signal having a frequency equal to a difference between an optical frequency of the second frequency-modulated optical signal and an optical frequency of the second optical local oscillation signal; and a transmitting circuit for outputting an optical signal subjected to intensity modulation by an output of the optical detector to an optical transmission path;

wherein the first optical frequency modulation portion and the second optical frequency modulation portion are set to be substantially equal to each other in frequency deviation, wherein a phase of an electric signal obtained by subjecting the first multiplexed optical signal to heterodyne detection in the optical detector is set to be substantially identical to a phase of an electric signal obtained by subjecting the second multiplexed optical signal to heterodyne detection in the optical detector.

2. An optical signal transmitter for applying frequency modulation to amplitude-modulated electric signals that have undergone frequency division multiplexing to optically transmit the electric signals, the optical signal transmitter comprising:

a distribution circuit for distributing the electric signals into a plurality of signal parts and outputting the signal parts;

a plurality of frequency modulation means for applying frequency modulation to each output of the distribution circuit and emitting each output, the plurality of frequency modulation means being substantially equal to each other in frequency deviation and in intermediate frequency and being substantially identical in phase of each output;

a multiplexing means for multiplexing outputs of the plurality of frequency modulation means and outputting multiplexed outputs; and a transmitting circuit for outputting optical signals subjected to intensity modulation by the output of the multiplexing means to an optical transmission path, wherein the distribution circuit distributes the electrical signals into two electric signals (N=2) and outputs these electric signals, the frequency modulation means includes:

a first differential distributor for distributing one of the two electric signals output from the distribution circuit into two electric signals in which phases have been inverted;

a first optical frequency modulation portion for outputting a first frequency-modulated optical signal applied frequency modulation to one output of the first differential distributor as a modulated input;

a second optical frequency modulation portion for receiving the other output of the first differential distributor as a modulated input and outputting a second frequency-modulated optical signal, the second frequency-modulated optical signal having an optical frequency apart from an optical center frequency of the first frequency-modulated optical signal output from the first optical frequency modulation portion by a frequency substantially equal to an intermediate frequency;

a first optical multiplexer for multiplexing the first frequency-modulated optical signal and the second frequency-modulated optical signal together so as to become identical in polarization direction and outputting a first multiplexed optical signal;

a second differential distributor for distributing the other output of the distribution circuit into two electric signals in which phases have been inverted;

a third optical frequency modulation portion for outputting a third frequency-modulated optical signal receiving one output of the second differential distributor as a modulated input to apply frequency modulation to the one output of the second differential distributor;

a fourth optical frequency modulation portion for receiving the other one of the two electric signals output from the second differential distributor as a modulated input and outputting a fourth frequency-modulated optical signal, the fourth frequency-modulated optical signal having an optical frequency apart from an optical center frequency of the third frequency-modulated optical signal output from the third optical frequency modulation portion by a frequency substantially equal to the intermediate frequency; and a second optical multiplexer for multiplexing the third frequency-modulated optical signal and the fourth frequency-modulated optical signal together so as to become identical in polarization direction and outputting a second multiplexed optical signal, the multiplexing means is a third optical multiplexing for multiplexing the first multiplexed optical signal output from the first optical multiplexer and the second multiplexed optical signal output from the second optical multiplexer so that a polarization direction of the first multiplexed optical signal becomes perpendicular to a polarization direction of the second multiplexed optical signal and outputting a third multiplexed optical signal, the optical signal transmitter further comprising:

an optical detector for applying heterodyne detection to the third multiplexed optical signal output from the third optical multiplexer and outputting an electric signal having a frequency equal to a difference between an optical frequency of the first frequency-modulated optical signal and an optical frequency of the second frequency-modulated optical signal and an electric signal having a frequency equal to a difference between an optical frequency of the third frequency-modulated optical signal and an optical frequency of the fourth frequency-modulated optical signal; and a transmitting circuit for outputting an optical signal subjected to intensity modulation by an output of the optical detector to an optical transmission path;

wherein the first frequency modulation portion, second frequency modulation portion, third frequency modulation portion, and fourth optical frequency modulation portion are set to be substantially equal to each other in frequency deviation, and a phase of an electric signal obtained by subjecting the first multiplexed optical signal to heterodyne detection in the optical detector is set to be substantially identical to a phase of an electric signal obtained by subjecting the second multiplexed optical signal to heterodyne detection in the optical detector.

3. An optical signal transmitter for applying frequency modulation to amplitude-modulated electric signals that have undergone frequency division multiplexing to optically transmit the electric signals, the optical signal transmitter comprising:

a distribution circuit for distributing the electric signals into a plurality of signal parts and outputting the signal parts;

a plurality of frequency modulation means for applying frequency modulation to each output of the distribution circuit and emitting each output, the plurality of frequency modulation means being substantially equal to each other in frequency deviation and in intermediate frequency and being substantially identical in phase of each output;

a multiplexing means for multiplexing outputs of the plurality of frequency modulation means and outputting multiplexed outputs; and a transmitting circuit for outputting optical signals subjected to intensity modulation by the output of the multiplexing means to an optical transmission path, wherein the distribution circuit distributes the electrical signals into N signals (N is an integer which is two or greater) and outputs these signals, the frequency modulation means includes N optical frequency modulation multiplexing circuits for multiplexing a frequency-modulated optical signal applied frequency modulation to each output from the distribution circuit as a modulated input and an optical local oscillation signal having an optical frequency apart from an optical center frequency of the frequency-modulated optical signal by a frequency substantially equal to an intermediate frequency together, and outputting a multiplexed signal, the multiplexing means is an optical multiplexing circuit for multiplexing outputs of the N optical frequency modulation multiplexing circuits and outputting a multiplexed signal, the optical signal transmitter further comprising:

an optical detection circuit for applying heterodyne detection to an output of the optical multiplexing circuit and outputting an electric signal having a frequency equal to a difference between an optical frequency of the frequency-modulated optical signal and an optical frequency of the optical local oscillation signal; and a transmitting circuit for outputting an optical signal subjected to intensity modulation by an output of the optical detection circuit to an optical transmission path;

wherein the N optical frequency modulation multiplexing circuits are set to be substantially equal to each other in frequency deviation and to be substantially identical to each other in intermediate frequency and in the phase of each of the N superposed electric signals obtained by applying heterodyne detection to multiplexed optical signals output from the N optical frequency modulation multiplexing circuits in the optical detection circuit.

4. An optical signal transmitter for applying frequency modulation to amplitude-modulated electric signals that have undergone frequency division multiplexing to optically transmit the electric signals, the optical signal transmitter comprising:

a distribution circuit for distributing the electric signals into a plurality of signal parts and outputting the signal parts;

a plurality of frequency modulation means for applying frequency modulation to each output of the distribution circuit and emitting each output, the plurality of frequency modulation means being substantially equal to each other in frequency deviation and in intermediate frequency and being substantially identical in phase of each output;

a multiplexing means for multiplexing outputs of the plurality of frequency modulation means and outputting multiplexed outputs; and a transmitting circuit for outputting optical signals subjected to intensity modulation by the output of the multiplexing means to an optical transmission path, wherein the distribution circuit distributes the electrical signals into N signals (N is an integer which is two or greater) and outputs these signals, the frequency modulation means includes N differential optical frequency modulation multiplexing circuits for distributing each output of the distribution circuit into two electric signals in which phases have been inverted, multiplexing a first frequency-modulated optical signal applied frequency modulation to one of the two electric signals input from the distribution circuit as a modulated input and a second frequency-modulated optical signal having an optical frequency apart from an optical center frequency of the first frequency-modulated optical signal by a frequency substantially equal to an intermediate frequency, the second frequency-modulated optical signal applied frequency modulation to the other one of the two electric signals input from the distribution circuit as a modulated input, and outputting a multiplexed signal, the multiplexing means is an optical multiplexing circuit for multiplexing outputs of the N differential optical frequency modulation multiplexing circuits and outputting a multiplexed signal, the optical signal transmitter further comprising:

an optical detection circuit for applying heterodyne detection to an output of the optical multiplexing circuit and outputting an electric signal having a frequency equal to a difference between an optical frequency of the first frequency-modulated optical signal and an optical frequency of the second frequency-modulated optical signal; and a transmitting circuit for outputting an optical signal subjected to intensity modulation by an output of the optical detection circuit to an optical transmission path;

wherein the N differential optical frequency modulation multiplexing circuits are set to be substantially equal to each other in frequency deviation and to be substantially identical to each other in intermediate frequency and in the phase of each of the N superposed electric signals obtained by applying heterodyne detection to multiplexed optical signals output from the N differential optical frequency modulation multiplexing circuits in the optical detection circuit.

5. An optical signal transmission system comprising:

the optical signal transmitter according to any one of claims 1 to 4, and an optical signal receiver including a photoelectric conversion means connected to the optical signal transmitter via an optical transmission path and a frequency demodulation means for demodulating an output of the photoelectric conversion means.

\* \* \* \* \*